US008869140B2

(12) United States Patent  
Todorova

(10) Patent No.: US 8,869,140 B2  
(45) Date of Patent: Oct. 21, 2014

(54) DEPLOYING SOFTWARE MODULES IN COMPUTER SYSTEM

(75) Inventor: Mariela Todorova, Sofia (BG)

(73) Assignee: SAP SE, Walldorf (DE)

( * ) Notice: Subject to any disclaimer, the term of this patent is extended or adjusted under 35 U.S.C. 154(b) by 1433 days.

(21) Appl. No.: 12/431,774

(22) Filed: Apr. 29, 2009

(65) Prior Publication Data

US 2009/0282401 A1 Nov. 12, 2009

Related U.S. Application Data

(60) Provisional application No. 61/051,692, filed on May 9, 2008.

(51) Int. Cl.
*G06F 9/44* (2006.01)
*G06F 9/445* (2006.01)
*G06F 11/14* (2006.01)

(52) U.S. Cl.
CPC .. *G06F 8/61* (2013.01); *G06F 8/65* (2013.01); *G06F 9/44505* (2013.01); *G06F 8/60* (2013.01); *G06F 11/1433* (2013.01)
USPC ............................ 717/175; 717/126; 717/177

(58) Field of Classification Search
USPC .................................................. 717/168–178
See application file for complete search history.

(56) References Cited

U.S. PATENT DOCUMENTS

| | | | |
|---|---|---|---|
| 6,892,382 B1 * | 5/2005 | Hapner et al. ................. | 717/174 |
| 7,685,577 B2 * | 3/2010 | Pace et al. ..................... | 717/136 |
| 8,087,035 B2 * | 12/2011 | Jurova et al. .................. | 719/328 |
| 2003/0018950 A1 * | 1/2003 | Sparks et al. ................. | 717/100 |
| 2004/0107291 A1 * | 6/2004 | Gamo ............................ | 709/232 |
| 2005/0108630 A1 * | 5/2005 | Wasson et al. ................ | 715/513 |
| 2005/0251810 A1 * | 11/2005 | Woollen et al. ............... | 719/312 |
| 2005/0262475 A1 * | 11/2005 | Halpern ........................ | 717/114 |
| 2005/0262477 A1 * | 11/2005 | Kovachka-Dimitrova et al. ............................. | 717/118 |
| 2005/0278274 A1 | 12/2005 | Kovachka-Dimitrova et al. | |
| 2005/0278338 A1 | 12/2005 | Todorova et al. | |
| 2005/0289538 A1 * | 12/2005 | Black-Ziegelbein et al. . | 717/177 |
| 2006/0026285 A1 * | 2/2006 | Osofsky et al. ............... | 709/225 |
| 2006/0037030 A1 | 2/2006 | Kovachka-Dimitrova et al. | |
| 2006/0179058 A1 * | 8/2006 | Bram et al. ....................... | 707/9 |
| 2006/0277537 A1 * | 12/2006 | Chan et al. .................... | 717/168 |
| 2007/0078988 A1 * | 4/2007 | Miloushev et al. ............ | 709/227 |
| 2007/0250830 A1 * | 10/2007 | Holmberg et al. ............ | 717/171 |
| 2008/0178174 A1 * | 7/2008 | Woolen ......................... | 717/177 |
| 2009/0055817 A1 * | 2/2009 | Maj ............................... | 717/173 |
| 2009/0249284 A1 * | 10/2009 | Antosz et al. ................. | 717/104 |
| 2009/0300093 A1 * | 12/2009 | Griffiths et al. ............... | 709/202 |

* cited by examiner

*Primary Examiner* — Lewis A Bullock, Jr.
*Assistant Examiner* — Tina Huynh

(57) ABSTRACT

Methods and systems are disclosed herein for deploying software modules in a computer system. In one embodiment, a number of containers are registered with a deployer. At least one container provides runtime environment for a corresponding type of software module in the computer system. The software modules are one of standalone software modules and components of software applications. From an archive file a number of files that include deployable software modules are extracted. The software modules corresponding to at least one of the containers are detected based on container specific detecting mechanisms. The detected software modules are validated in order to test their functionality and interoperability. When the software modules are validated, they are distributed for implementation in the corresponding containers.

20 Claims, 10 Drawing Sheets

DEPLOYING SOFTWARE MODULES IN COMPUTER SYSTEM

This application is related to U.S. Provisional Patent Application Ser. No. 61/051,692, entitled "Java EE 5 Deployment in Application Server Java", filed May 9, 2008, from which priority is claimed, and which is hereby incorporated by reference.

FIELD OF INVENTION

The field of the invention relates generally to electronic data processing and to software installation and management. More specifically, a method and a system for deploying software modules in a computer system are described.

BACKGROUND OF THE INVENTION

Due to the growing complexity of software solutions, software lifecycle management has become a critical task. The number of requirements associated with the software lifecycle management is increasing. This is especially true with respect to the development and maintenance of large enterprise computer systems. The modern enterprise computer systems run software applications that are built from a number of separate, sometimes independent, software components or modules. Thus, the deployment of a software application in an enterprise computer system involves installation and integration of a number of smaller software modules. At the same time, the maintenance of enterprise computer systems has to comply with tight operational requirements to ensure minimum downtime, high availability and cost efficiency. Accordingly, the lifecycle of every software module in the computer system is managed individually to retain the operability of the rest of the software components, if possible.

The existing enterprise computer systems are developed based on variety of architecture models. Traditional client-server computer systems employ a two-tiered architecture model, such as model 100 illustrated in FIG. 1A. One or more software applications 106 are executed on client 102 of the two-tiered architecture model 100. Application 106 is developed as a monolithic set of program code that includes a graphical user interface (GUI) component, presentation logic, business logic, etc.

Typically, "business logic" component of a software application represents the core functionality of the application, i.e., the rules governing the underlying process or services provided by this application. Whereas, a "presentation logic" component of a software application describes the specific manner in which the results of business logic processing are formatted and presented to the user.

Furthermore, application 106 has a network interface that enables client 102 to communicate with one or more servers 104 over network 110. Network 110 could be dedicated to connecting client 102 with server 104 within local area network (LAN) or wide area network (WAN). Alternatively, network 110 could be operable for connecting a group of computer systems within an intranet or Internet environment. Finally, network 110 could apply any of the existing network communication protocols, including transmission control protocol/internet protocol (TCP/IP).

Client 102 represents one of the tiers of the two-tier computer system architecture model. Client 102 provides an environment for executing application 106. Server 104 represents the other tier. Database 108 is maintained on server 104 to provide storage for application 106. Database 108 may store various types of business and system data depending on the functionality of application 106. For example, on database 108, application 106 could save, extract and process data for customers, inventory records, transaction logs, etc. Furthermore, database 108 may hold source code files of the software modules on application 106. Database 108 may also include data access logic used by the business logic of application 106 to store and retrieve data.

The two-tier architecture model for building computer systems can be effective but has certain limitations. These limitations become apparent when employed within large enterprise computer systems. For example, even with the aid of automated administration tools, the lifecycle management of two-tiered applications on a large number of different clients is a difficult task. Moreover, the tightly integrated business logic, presentation logic and user interface logic make the program code of such applications very complex, hard to maintain, and prone to errors. For example, a change to the user interface would require changes in business logic and presentation logic, and vice versa.

In the enterprise world, the established business rules change dynamically due to factors such as changes in statutory requirements, market developments, etc. Consequently, there are frequent requirements to change the existing software applications or install new software applications that provide certain enterprise services or that support specific business processes. Therefore, a more flexible architecture for building computer systems is appropriate.

To overcome the limitations associated with the two-tiered client-server architecture model, a multi-tiered architecture model for building computer systems has been developed, as illustrated in FIG. 1B. In a computer system with multi-tiered architecture, the presentation logic and the business logic are separated from each other and from the user interface. User interface 122 in client 132 is connected to presentation layer 124 via network 110. Presentation layer 124 is responsible for the definition and execution of the presentation logic and could be implemented on separate presentation server 134. Presentation layer 124 communicates with business layer 126 that could be implemented on business layer server 136. Database 128 provides storage on database server 138 for data relevant to the application including, user interface 122, presentation layer 124 and business layer 126. Presentation server 134, business layer server 136 and database server 138 could be implemented into one or more dedicated physical servers connected from client 132 via physical network 110.

The separation between the logic components and the user interface provides more flexible and scalable architecture for building computer systems, compared to the two-tiered model. For example, if business rules change, only the business logic implemented in business layer 126 could be changed to a new version without touching the program code on the rest of the levels. In another example, presentation layer 124 may provide support for a variety of third party user interfaces 122, e.g., popular browsers such as Internet Explorer™ or Mozilla Firefox™.

The multi-tiered architecture model illustrated in FIG. 1B may be implemented using a variety of different software technologies at each layer or tier, including Microsoft.NET™ technology by Microsoft Corporation, Advanced Business Application Programming (ABAP) technology by SAP AG, etc. One of the most popular software technologies for developing multi-tiered software applications is Java Enterprise Edition™ (Java EE) technology initially introduced by Sun Microsystems Inc. Java EE technology has been further co-developed by many other software vendors, and described in a special set of documentation that is referred to as Java EE Specification in this document. Due to its popularity and extensive use, Java EE Specification is publicly recognized as a standard. Therefore, different software developers could build applications compliant with Java EE Specification, and these applications could be executed on computer systems that are compliant with Java EE Specification, e.g., those that provide Java EE environment.

FIG. 1C illustrates an exemplary Java EE environment, in which core business logic of a software application is handled by Enterprise JavaBean™ (EJB) software components. EJB container 148 provides runtime environment for the EJB components within Java EE engine 142. The presentation layer is responsible for generating servlets and Java Server-Page™ (JSP) software components. Web container 146 provides runtime environment for JSP components within Java EE engine 142. The JSP components could be accessible with different types of popular Internet browsers at client 132 via network 110 and via Web server 144. Generally, Java EE engine 142 is an environment provided by an application server built according to Java EE Specification where software applications built with numerous integrated software modules are executed, including EJB components and JSP components. Database 128 stores relevant application and system data.

As enterprise application development projects grow larger and more diverse, deployment and maintenance of applications becomes increasingly important. For example, it is useful to have software lifecycle management involving a variety of container services, application programming interfaces (API), transaction management modules, notification systems, resource pooling, and security policy providers. Therefore, software vendors develop deployment tools to ensure such means of lifecycle management of the software applications and their components such as software modules.

In this document, the term "deploy tool" refers to administrative software application operable to deploying software application components to one or more destination computer systems, such as application server or cluster of application servers running on one or more physical computer servers. There are various requirements for deployment of software applications on particular application servers. These requirements depend on the software technology upon which the application server is built. Respectively, deployment tools may have to comply with the requirements of a certain application server software technology specification. For example, to deploy software applications on Java EE application server, a deployment tool may have to comply with the deployment requirements established in Java EE Specification.

FIG. 2 illustrates computer system 200 with an exemplary implementation of deploy tool 203 that converts various source code files 202 stored in repository 201 in an format that is appropriate for deployment on application server 213. For ease of understanding, FIG. 2 is drawn to comply with Java EE Specification providing component based object oriented environment for running software applications. However, the technique described herein is equally applicable to other environments. An application may include a number of modules operable for various functionalities. For instance, an application may include a number of software modules that perform backend business logic. Another application may consist of software modules that provide some form of Web interface, e.g., a Web application. Source code files 202 within repository 201 may include business logic source code to build or modify business logic components (e.g., EJBs in the case of Java EE environment) and Web application source code to build or modify Web application components (e.g., JSPs in the case of Java EE environment).

In the example illustrated with FIG. 2, various source code files 202 of modules of an application are passed to archive builder 204. Archive builder 204 creates two separate types of archive files. The first type of archive files are with extension ".jar" to indicate Java™ archive (JAR) files that contain business logic software modules. The second type of archive files are with extension ".war" to indicate Web archive (WAR) files that contain World Wide Web (Web) application software modules. JAR files 208 and WAR files 209 are then combined into an enterprise archive (EAR) file 206 by assembler 205. An archive file is a file that contains other files, e.g., file entries. The file entries in an archive file could be distributed within a directory structure.

Deployer 211 receives EAR file 206, analyzes its content, and sends the various pieces to their appropriate destinations. In the simplified illustration of FIG. 2, the content of JAR files 208 is sent to EJB container 215, and the content of WAR files 209 is sent to Web container 216 of application server 213. Application server 213 is assumed to have base environment 214 that provides a set of services 220. Containers 215 and 216 themselves can be viewed as subordinate environments of base environment 214, each having additional layer of services 219, according to Java EE Specification. Additionally, different vendors could introduce containers other than those described by Java EE Specification to provide runtime environment for various other modules of a software application.

FIG. 2 depicts exemplary contents of EAR file 206. Apart from the software components within JAR files 208 and WAR files 209, EAR file 206 also includes application deployment descriptor (DD) 207 (e.g., file "application.xml", according to Java EE Specification). Furthermore, WAR file 209 includes module DD 210 (e.g., Web application DD as file "Web.xml"). The role of deployment descriptors 207 and 210 is to provide configuration metadata for the software components in JAR files 208 and WAR files 209. Version 5 of Java EE Specification introduces annotations as an additional way to provide configuration metadata. The deployment of software modules requires detecting the modules within the archive files based on the contents of the archive file entries, including the configuration metadata.

The Java EE compliant software applications are deployed on Java EE compliant application servers with the help of a compatible deploy tool. The compatibility of a deploy tool, either vendor specific (e.g., proprietary) or standardized (e.g., publicly recognized), could be ensured by adding a plug-in component. Such plug-in component provides functionality that is required by a deploy tool in order to follow a specific software deployment process. In FIG. 2, for instance, deployer 211 could be a plug-in component to a third party deploy tool 203.

The vendors of application servers have to provide reliable and efficient deploy framework for installation and integration of software components. An application server developed by an independent vendor could comply with an established application server specification, but in addition, could include features that are not included in the specification. Accordingly, deploy framework of such an application server has to ensure compliance with deployment requirements of the adopted technology specification, and with the features that are not part of the specification. Based on the specified deployment requirements, and the additional features, different application server vendors provide various proprietary deployment solutions.

SUMMARY OF THE INVENTION

Methods and systems for deploying software modules in a computer system are described herein. A number of containers are registered with a deployer. At least one of the containers provides runtime environment for a specific type of software module in the computer system. From an archive file a number of files that contain deployable software modules are extracted. The software modules that correspond to one of the containers are detected based on container specific detecting mechanisms. The detected software modules are validated in order to test their functionality and interoperability. When the software modules are validated, they are distributed for installation in the corresponding containers.

BRIEF DESCRIPTION OF THE DRAWINGS

A better understanding of the present invention can be obtained from the following detailed description in conjunction with the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1A:
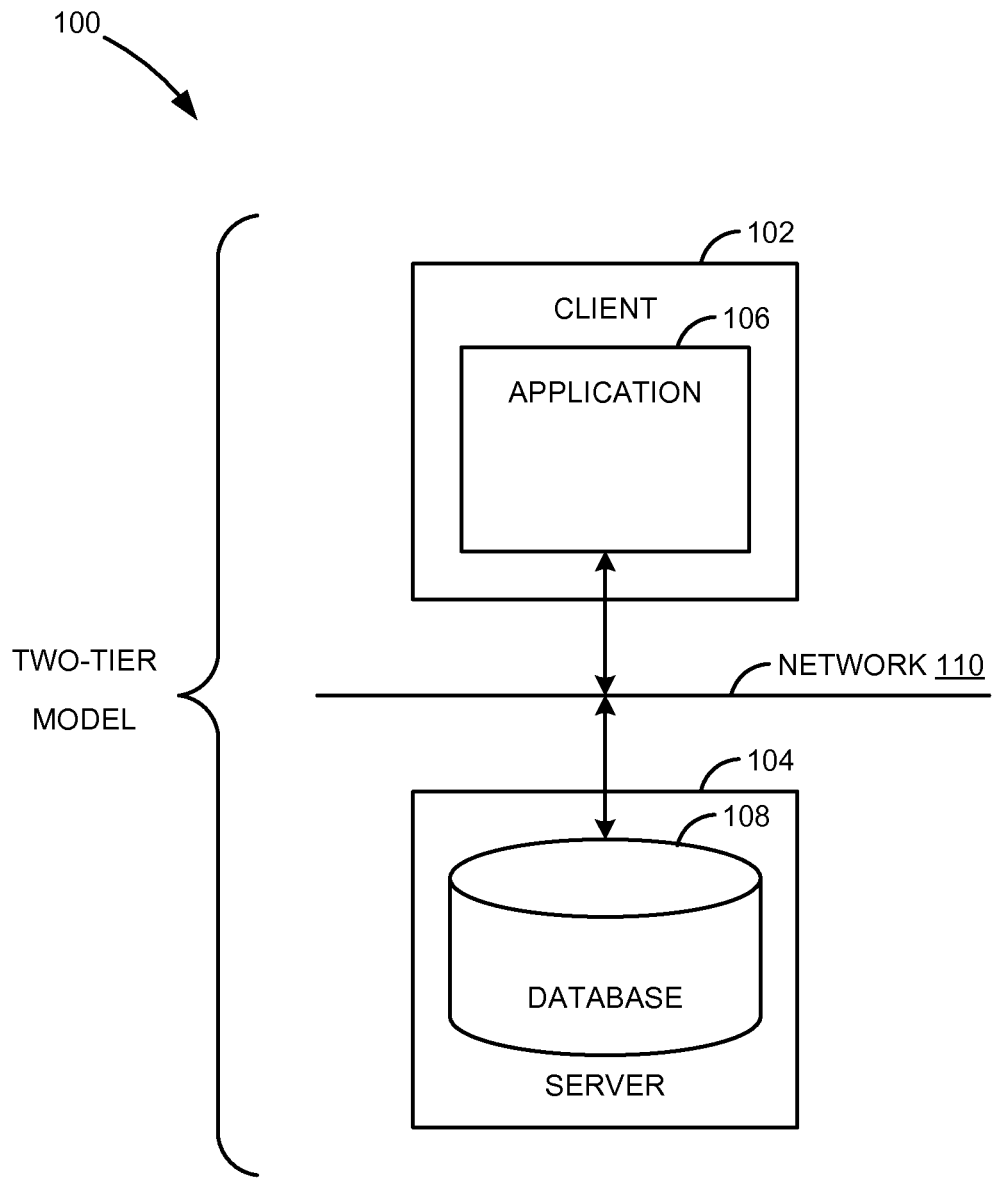
FIG. 1A is a block diagram of two-tier architecture model for building computer systems.
Figure 1B:
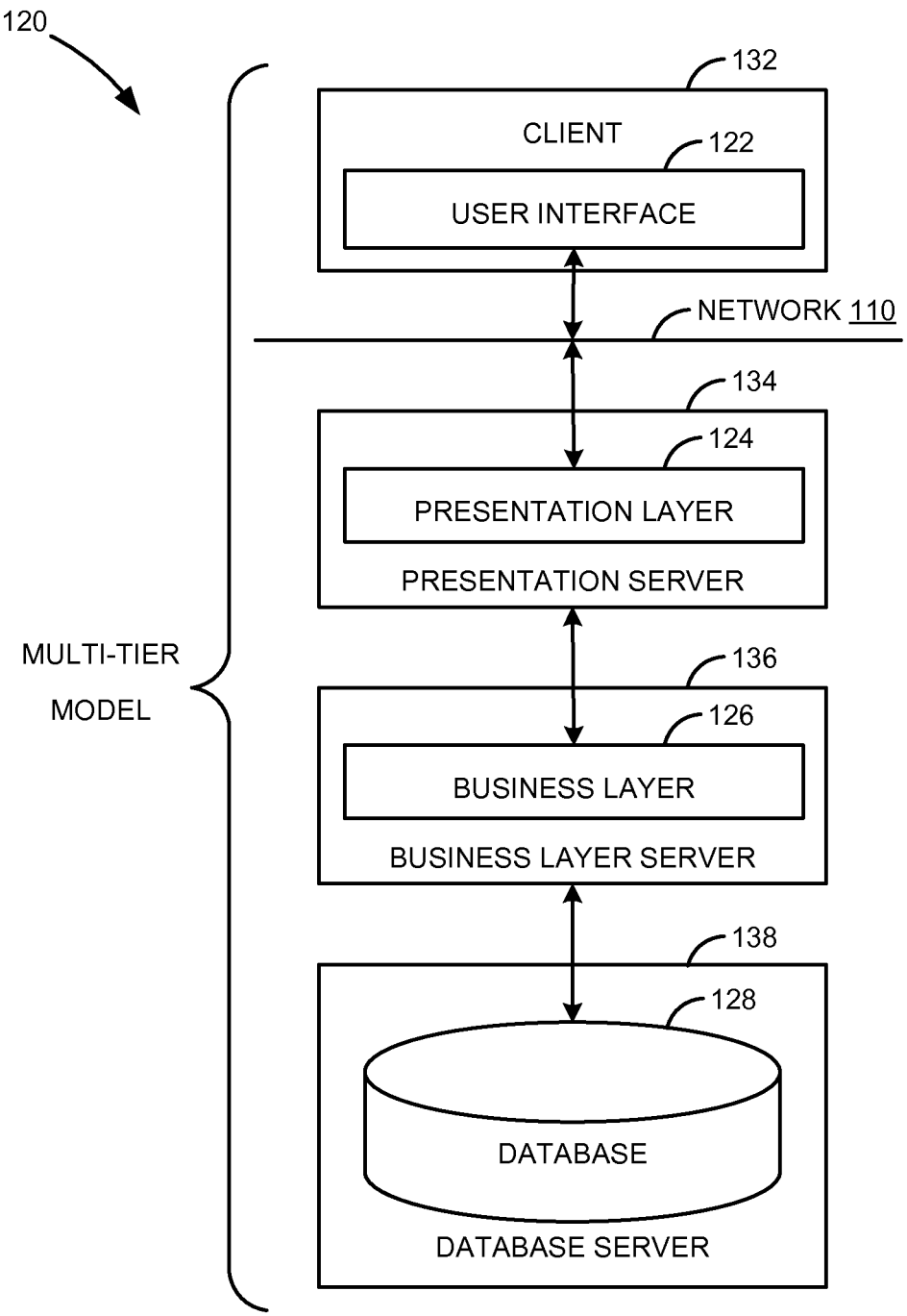
FIG. 1B is a block diagram of multi-tier architecture model for building computer systems.
Figure 1C:
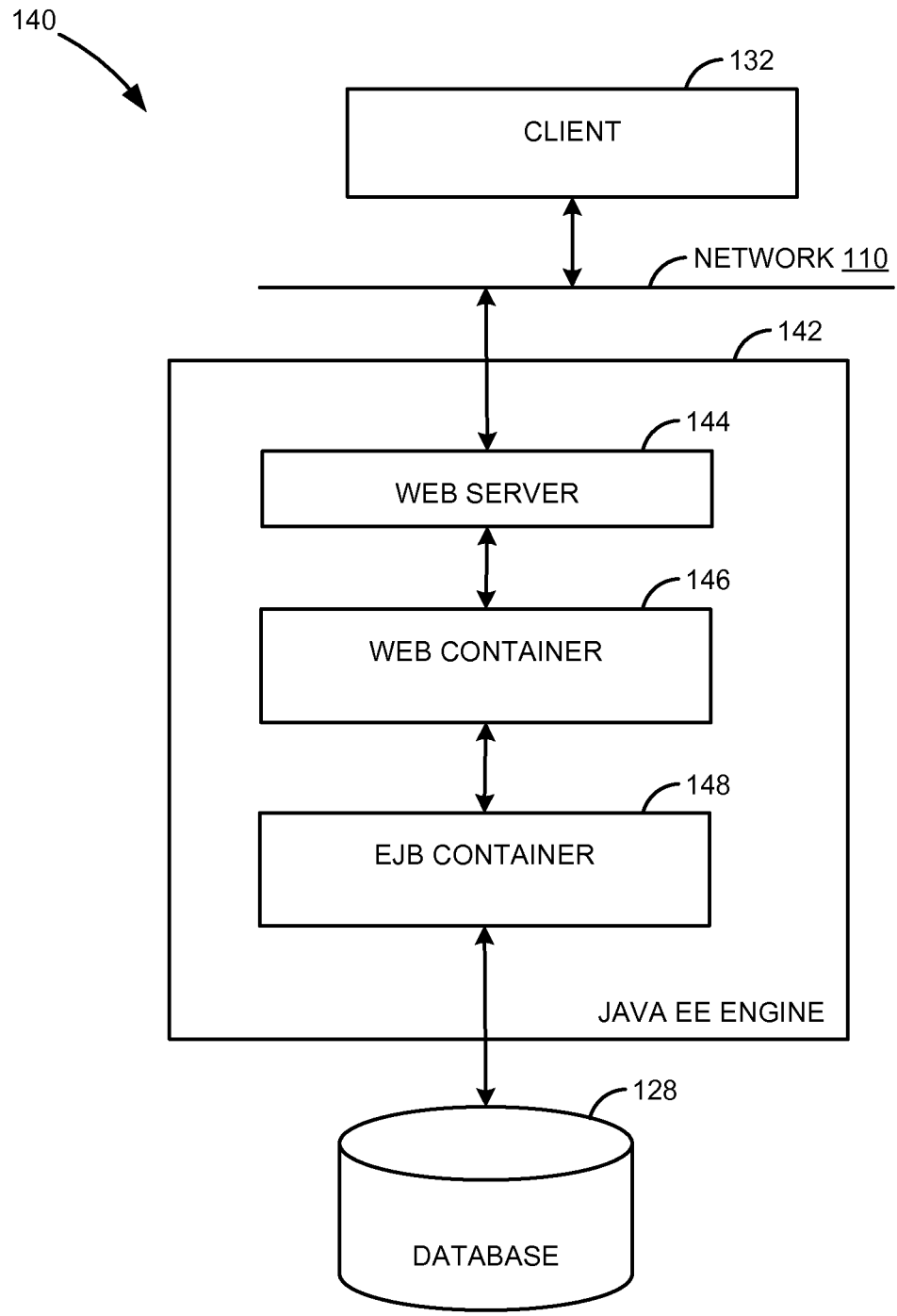
FIG. 1C is a block diagram of multi-tier architecture model for building computer systems according to Java EE Specification.
Figure 2:
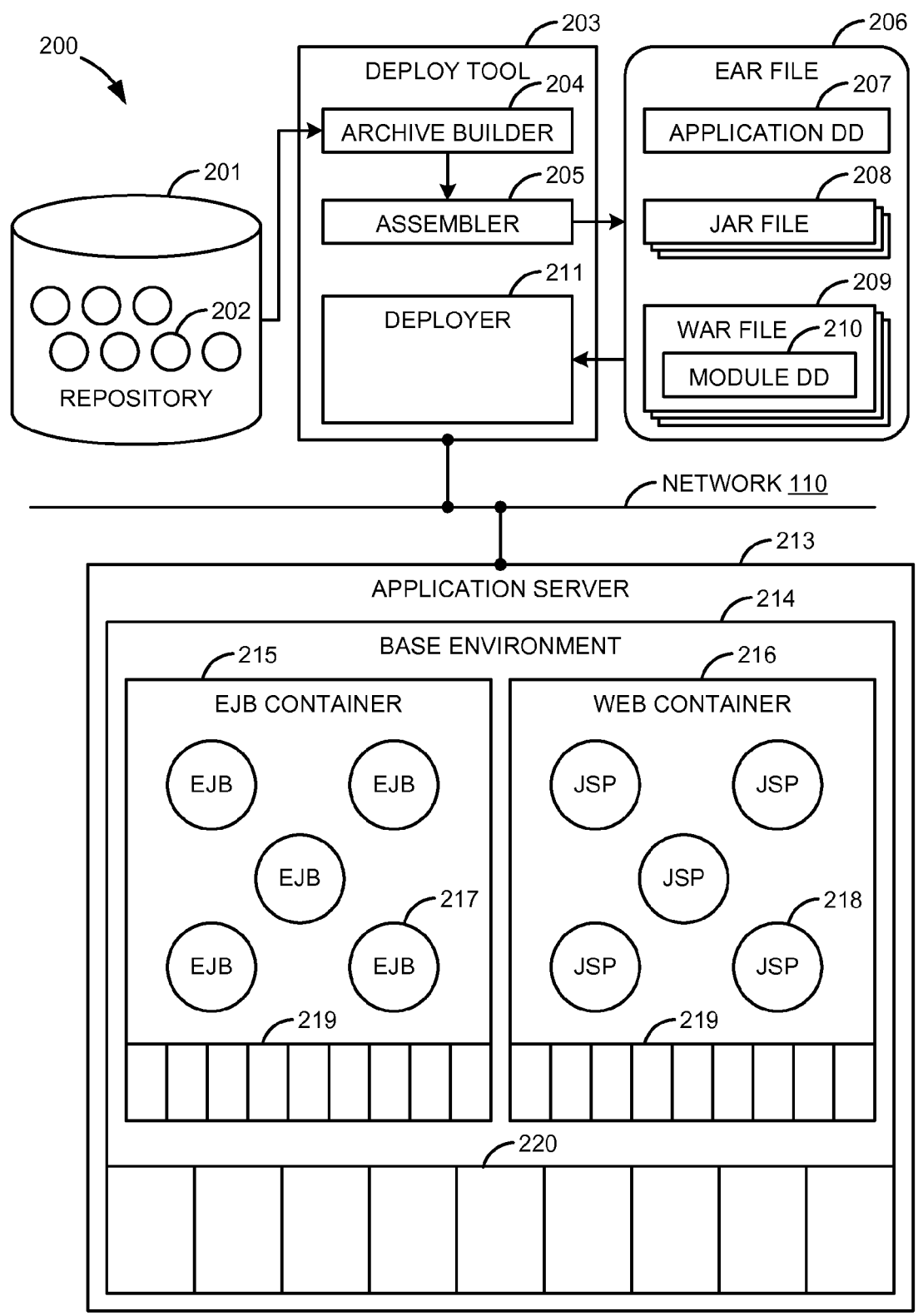
FIG. 2 is a block diagram of an exemplary computer system where a deployment tool is implemented for deploying software components based on Java EE Specification.

Described below are methods and systems for deploying software modules in a computer system. Throughout the description, for the purpose of explanation, many details pertinent to Java EE Specification are provided. However, as one skilled in the art will understand the principles of the invention may be applied to other software technologies as well.

Software deployment processes typically aim to meet requirements as specified in recognized standards or specifications, e.g., Java EE Specification. The deployment of software components in a computer system ensures efficient implementation and integration of the components within a runtime environment provided by the computer system. The runtime environment of the computer system may be provided by one or more application servers. In one embodiment of the invention, a dedicated deploy service (Deploy Service) of an application server within the computer system conducts the whole process of deployment. Deploy Service preferably complies with the deployment requirements of a recognized specification.

Using Java EE Specification for illustration, Deploy Service could be a core service within a Java EE compatible application server. This core service is responsible for the deployment of Java EE applications and for the distribution of their modules to the corresponding containers of the application server. Deploy Service controls actions that are performed on the software applications during their lifecycle, including requesting containers for information about deployed software components, or initiating a demand to modify deployed software component.

Deploy process may allow using third party deploy tools to deliver software modules for deployment in a computer system. The computer system hosts one or more application servers built upon a standard specification (e.g., Java EE Specification) to provide running environment for the delivered software modules. Deploy Service receives the software modules and conducts the deploy process within an application server. As an application server service, Deploy Service may utilize various mechanisms provided by other services or system components of the application servers (e.g., containers, interfaces, libraries, etc.) during the deploy process. Further, the deploy process may allow deployment of software modules that are developed under different versions of the specification. The detecting and generating mechanisms could handle the discrepancies between versions.

In one embodiment of the invention, the deploy framework can be implemented as a part of SAP NetWeaver™ application server Java™ (AS Java). AS Java is an application server that is compliant with Java EE Specification and includes certain vendor specific features. This deploy framework and the realized deployment process are described in detail in the following paragraphs. Different solutions based either on Java EE Specification or on other application development technologies that embody the invention are also possible and obvious for one of ordinary skill in the art.

Figure 3:
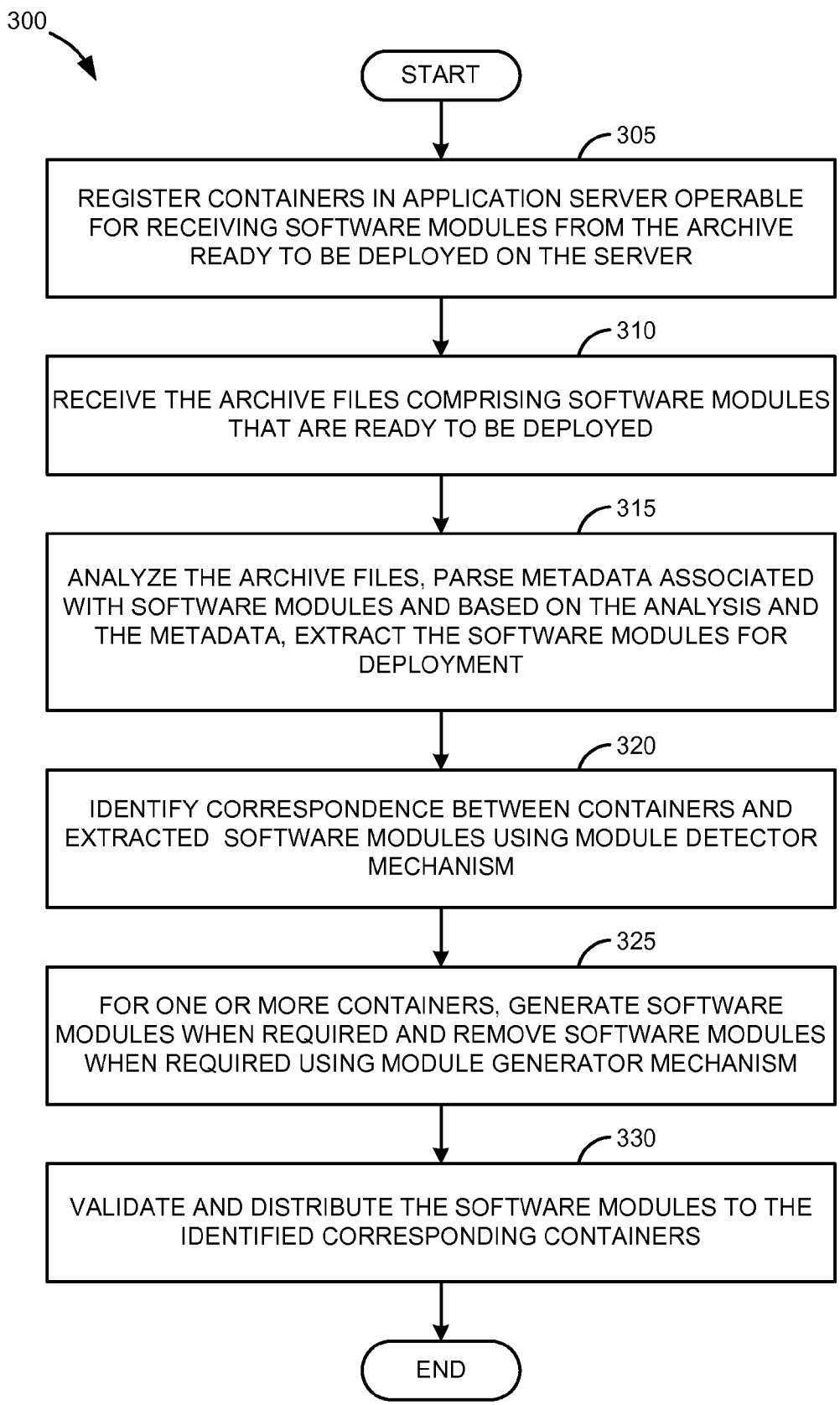
FIG. 3 illustrates a process for deploying software modules in a computer system at abstract level, according to one embodiment of the invention.

FIG. 3 illustrates process 300 for deploying software modules in a computer system at abstract level, according to one embodiment of the invention. At block 305, Deploy Service registers a number of containers. Containers are system services in an application server, e.g., AS Java, that provide runtime environment for various software modules. By the registration of the containers, Deploy Service can manage the deployment of software modules to those containers, and to receive access to deployment logic that is implemented in the containers, if any. The action illustrated with block 305 is a preliminary requirement and may not be regarded as a step in the deployment process.

At block 310, Deploy Service receives an archive file. For example, a user provides an archive file, e.g., an EAR file or standalone module (WAR file, JAR file, etc.) for deployment. Archive files are user entries for Deploy Service. At block 315, the contents of the received archive file is initially analyzed. As part of this analysis, Deploy Service decides how to handle the deployment of the archive. Furthermore, Deploy Service parses the available metadata that describes the software modules included in the archives Based on the analysis and the parsed metadata, Deploy Service extracts file entries from the archive in a temporary folder in a file system accessible by the application server. The extracted file entries contain the source code of the software modules to be deployed.

Once extracted, the source files describing the software modules could be distributed to the registered containers for deployment. At block 320, a correspondence is identified between the registered containers and the software modules in the archive. For each container, corresponding software modules are detected. The detection of corresponding software modules could include various methods, e.g., based on metadata provided by deployment descriptors or file annotations, based on file names or file name extensions, based on software module type, etc. Each or some of the registered containers may provide module detector mechanism. Such mechanism is used by Detect Service to check the contents of the extracted files in order to establish correspondence between the container providing the module detector, and a software module.

Additionally, each or some of the registered containers could define a mechanism for generating software modules. At block 325, Deploy Service generates software modules for each container that have implemented such mechanism, when required. Whether a generation of a module is required or not is determined by one or more logical conditions established by a module generator mechanism implemented in a container. For example, if the received EAR file contains certain type of software modules, additional software modules are created. More specifically, an EJB software module providing Web service could be included in a JAR file, however, a servlet should be available for the Web service to be accessible. Since EJB modules do not contain servlets originally, a new WAR file is generated with the servlet in it. All this logic can be fulfilled with the mechanism for generating a new module. Furthermore, generating mechanism could include logic for removing certain software modules from the deployment process.

After determining the module that have to be deployed in the registered containers, at block 330, a validation of every module is performed. Validated modules are distributed to their corresponding containers for installation, e.g. technical or actual deployment. The validation of the determined modules includes tasks as checking the correspondence between the metadata and the class files of the software modules. For this purpose, the metadata coming from deployment descriptors have to be merged with the metadata coming from annotations, according to one embodiment of the invention. The output of this merge activity is a container specific model incorporating all descriptive data of the deployable archives Validity checks are executed over the model and once they have passed, the validated model can be given to containers for further usage. An advantage is the fact that model is built and validated once and then simply handed over to containers. Model representations are specific for each container, accordingly each container provides a logic for building the model which is invoked by Deploy Service or by a separate service or library dedicated to software module validation.

To continue with describing the deployment process, a better understanding of the role and structure of the software modules is useful. The software modules are the simplest atomic units that can be deployed on an application server. Java EE Specification identifies four standard module types: "Web", "EJB", "java" and "connector" modules. The standard modules to be deployed could be described by metadata included in a deployment descriptor, according to the specification. There are two additional types of standard modules defined in Java EE Specification, i.e. "persistent unit" and "Web service" modules. The software modules from the later two types are not described in deployment descriptors. They have to be detected at deploy time based on certain rules. For example, based on file names matching rules.

Additionally, AS Java supports proprietary containers that deploy other module types. Such proprietary containers are not described in Java EE Specification, and therefore are referred to as non-Java EE containers. Respectively, the deployable modules of types that are not defined in Java EE Specification are referred to as non-Java EE modules. There large number of containers that can deploy anything ranging from extensible markup language (XML) configuration files to music files of different formats.

Software modules typically characterized by two common properties: a container type, and a file. During deployment, a software module is distributed to a corresponding container type. One file can contain more than one software module. The software modules of a single file can be deployed on one or more containers of different container types. Hence, it is possible to have one or more software modules with the same file property but with different container types. In general, the software modules define many-to-many relationships between the files within a deployable archive and the containers of one or more application servers in a computer system.

Figure 4:
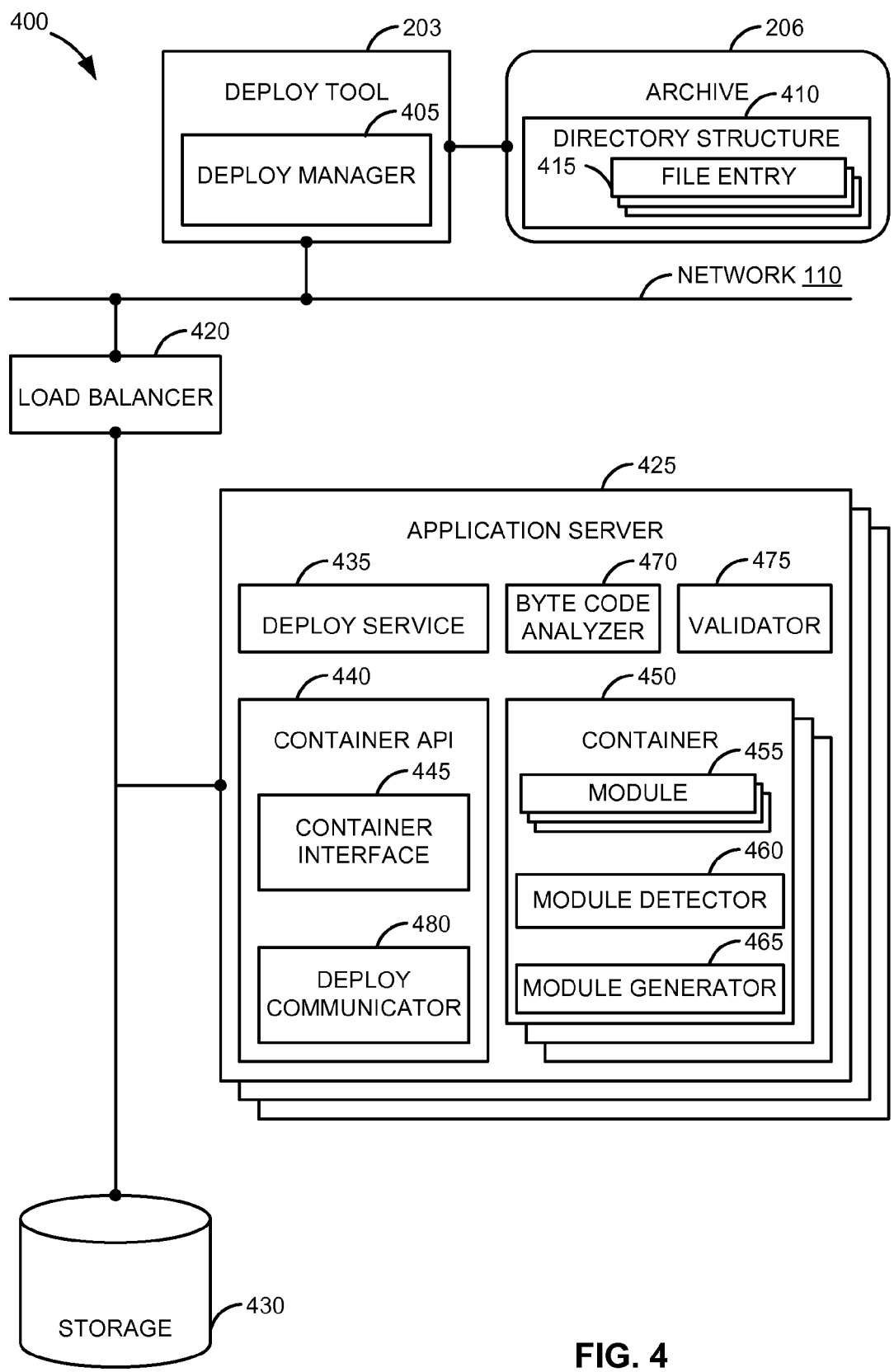
FIG. 4 is a block diagram of an exemplary computer system where is implemented a solution for deploying software modules, according to one embodiment of the invention.

FIG. 4 is a block diagram of an exemplary computer system 400 having implemented a deploy framework to deploy software modules in accordance with one embodiments of the invention. Computer system 400 illustrates basic interactions between deploy tool 203 and application server 425. Application server 425 could be compatible with a specific software development technology. For instance, in this document, application server 425 is AS Java and is compatible with Java EE Specification. A person with ordinary skill in the art it would understand that application server 425 could be developed using other software technologies.

Application server 425 could be realized as a standalone system module working on a single physical server. Alternatively, computer system 400 could include a number of application servers 425 working simultaneously on one or more physical servers, as illustrated in FIG. 4. Application servers 425 in computer system 400 may have similar configuration and all or part of application servers 425 could operate as a cluster. FIG. 4 illustrates the structure of only one of application servers 425.

Deploy tool 203 could be a third party administrative client tool that is operable for a user to deploy software applications. Deploy tool 203 includes deploy manager 405 to integrate deploy tool 203 with application server 425 to manage the deployment of software modules. Deploy manager 405 could be a plug-in provided by the vendor of application server to enable third party administrative tools to integrate with the deploy framework. From a user's perspective, deploy manager 405 handles the lifecycle management of software modules on application servers 425 in computer system 400.

Deploy tool 203 connects to application server 425 via network 110, e.g., intranet, Internet, etc. When there are more than one application servers 425 as illustrated in FIG. 4, the deployment requests of deploy tool 203 are routed to one of application servers 425 by load balancer 420. Application servers 425 could store shared data on storage 430. For example, such shared data are the code files of the software modules. Thus, when a software module is deployed on one of application servers 425, the rest of the clustered application servers 425 could execute the module from the code files stored on storage 430. Additionally, each application server could store private data on storage 430 as well.

The software applications or the software modules to be deployed on application server 425 are delivered in the form of archive 206. Archive 206 could be an enterprise archive (EAR) file. EAR files have extension ".ear". The deployable software modules are included in one or more file entries 415 in archive 206. Archive 206 also contains other deployment information that is also included as file entries 415. According to one embodiment, file entry refers to a file that is packed in an archive together with other files. File entries 415 are packed in archive 206 within directory structure 410. Respectively, the packed files are placed in one or more folders within archive 206.

The software modules delivered with archive 206 as file entries 415 are deployed on application servers 425 by one or more containers 450 as modules 455. Containers 450 provide runtime environment where the deployed software modules are executed. As there are different types of software modules, preferably each container 450 provides specific environment for a specific type of software module. The Java EE Specification defines several types of containers to provide runtime environment for the specified types of software modules. However, the architecture of application server 425 could be enhanced by including containers 450 that are not originally defined in Java EE Specification, e.g., non-Java EE containers. Such non-Java EE or non-standard containers could deploy non-standard software modules, e.g., software modules of types that are not defined in Java EE Specification (non-Java EE).

In order to deploy the software modules in archive 206 to their corresponding containers 450, application server 425 utilizes functionality provided by a deploy framework, according to one embodiment of the invention. The deploy framework of application server 425 comprises a Deploy Service 435. Deploy Service 435 serves to extend and enhance the Java EE compliant architecture of application server 425. Deploy Service 435 along with container API 440 help to deploy the various deployable J2EE and non-J2EE software modules using J2EE and non-J2EE containers 450, respectively.

Deploy Service 435 is a core service of application server 425 and manages containers 450 via container interface 445 provided by container API 440. Container API 440 could be represented on application server 425 as an interface defined as a development component. There is a contract established between containers 450 and Deploy Service 435 defined by container interface 445. Deploy Service 435 conducts deployment process. Generally, Deploy Service 435 receives archive 206 for deployment from deploy manager 405. Then, Deploy Service 435 invokes and controls the particular steps of the deployment process. The deployment logic as specified is carried out before software modules have actually reached containers 450.

According to one embodiment of the invention, container API 440 provides container interface 445 that is implemented by container services associated with containers 450. Such implementation facilitates Deploy Service 435 to identify containers 450 and to invoke various functionalities of containers 450. Container API 440 provides a container management for registration of containers 450 with Deploy Service 435. Accordingly, the container services may register their corresponding containers 450 with Deploy Service 435 through container API 440 when containers 450 become available and are ready to deploy software modules. Additionally, containers 450 may be unregistered when they stop or become unavailable.

With the registration of container 450, an object is instantiated to provide information about the registered container. In one embodiment of the invention, such object is "containerInfo". The "containerInfo" object instantiated for particular container 450 may include information for identifying container 450. Furthermore, "containerInfo" object instance may have set of properties with "set" and "get" methods. Some of the properties include:

determination of whether container 450 is a Java EE container (e.g., "EJB", "Web", "application", "client", "resource adapter") or a non-J2EE container (e.g., SAP container);

specification of the type of the deployed components (e.g., "String j2eeModuleName" for J2EE container 450 and "String moduleName" for non-J2EE container 450);

specification of a priority of a container 450 (e.g., when an application is being deployed, stopped, and started, Deploy Service 435 would know in what order to notify the concerned containers 450);

specification of a unique name for container 450 (e.g., "String name");

specification of a set of extensions of files that represents components to be deployed on respective container 450 (e.g., "String [ ] fileExtensions" subscription);

specification of a set of names of files that represent components to be deployed on respective container 450 (e.g., "String [ ] filenames" subscription);

specification of the name of the service that provides container 450 (e.g., "String serviceName");

determination of whether container 450 supports the operation "single file update" (e.g., "Boolean supportsSingleFileUpdate");

specification of the kind of resource types that are supported by container 450 (e.g., "String [ ] resourceTypes").

During the deployment process, Deploy Service 435 analyzes the content of archive 206 to determine the software modules to be deployed and to extract the corresponding file entries. According to one embodiment, such analysis is called byte code analysis and in order to perform it, Deploy Service invokes byte code analyzer 470. The determination of the relevant software modules could depend on various factors, including Java EE Specification definitions, subscriptions of containers 450 for files with specific names or extensions, descriptive data, etc. Archive 206 could contain metadata that is parsed by byte code analyzer 470. The metadata could provide information about the software modules in archive 206. Furthermore, metadata could provide important configuration information for the corresponding software modules. The metadata could be extracted from file entries 415.

After determining software modules to be deployed, Deploy Service 435 may extract file entries 415 that represent the determined software modules. The software modules are then delivered for deployment to corresponding containers 450. According to one embodiment of the invention, file names and file extensions of file entries 415 may be used by Deploy Service 435 to identify correspondence between the different software modules and containers 450. Accordingly, Deploy Service 435 may automatically recognize container 450 to which a software component should be distributed based on the data in "containerInfo" instances. For example, if a software module file has an extension ".war" (WAR file), and the Java EE "Web" container 450 has specified this extension in its "containerInfo" instance, Deploy Service 435 may distribute the WAR file to "Web" container.

Some containers 450 define a more complex mechanism for detecting corresponding software modules for deployment. Such containers 450 implement module detector 460. Module detector 460 is a mechanism that, when invoked by Deploy Service 435, performs predefined dynamic analysis of file entries 415 to identify corresponding software modules. In addition to module detector 460, some containers 450 may further implement module generator 465. Module generator 465 is a mechanism to generate one or more additional software modules, e.g., class files, under predefined conditions. Module generator 465 could also be used for removing or ignoring, software modules from the deployment process. When available, module generator 465 is invoked by Deploy Service 435. Generating and removing follow predefined logic of module generator 465. For example, the predefined logic is based on characteristics of a detected software module.

The detected software modules are distributed by Deploy Service 435 to corresponding containers 450 for deployment. Before this final step, according to one embodiment of the invention, Deploy Service 435 invokes validator 475 to validate each of the detected software modules. Deploy Service 435 collects data that is required for the tests of validator 475. Such data includes parsed metadata, e.g., descriptive information and annotations, the detected software modules, and all outside resources referenced by the software modules or the location of these resources. Validator 475 provides a report showing any encountered error or warning concerning the functionality of the software modules. For each correct software module, Validator 475 outputs a validated model that is distributed to corresponding container 450 during deployment of the module.

According to one embodiment of the invention, the deploy framework of application server 425 is provided by integration between Deploy Service 435, byte code analyzer 470, validator 475, container interface 445 and registered containers 450. In addition to container interface 445, container API 440 may provide deploy communicator 480. Deploy communicator 480 allows bi-directional communication between Deploy Service 435 and containers 450. Thus, each container 450, during registration with Deploy Service 435, may obtain an instance of deploy communicator 480 to communicate back with Deploy Service 435.

Using deploy communicator 480, containers 450 may send to Deploy Service 435 information about their status, to request runtime information, to initiate operations, etc. Such information allows the Deploy Service 435 to be more efficient in managing the lifecycle of modules 455 deployed in containers 450. For example, through deploy communicator 480, containers 450 may request Deploy Service 435 to lock or stop any of modules 455 when required by a system process by a running software application.

The integration between the elements of the deploy framework of application server 425 allows the deployment of the software modules included in archive 206. Software modules 455 are deployed in containers 450 as a result of a deployment process that is conducted by Deploy Service 435 an element of deploy framework.

Figure 5A:
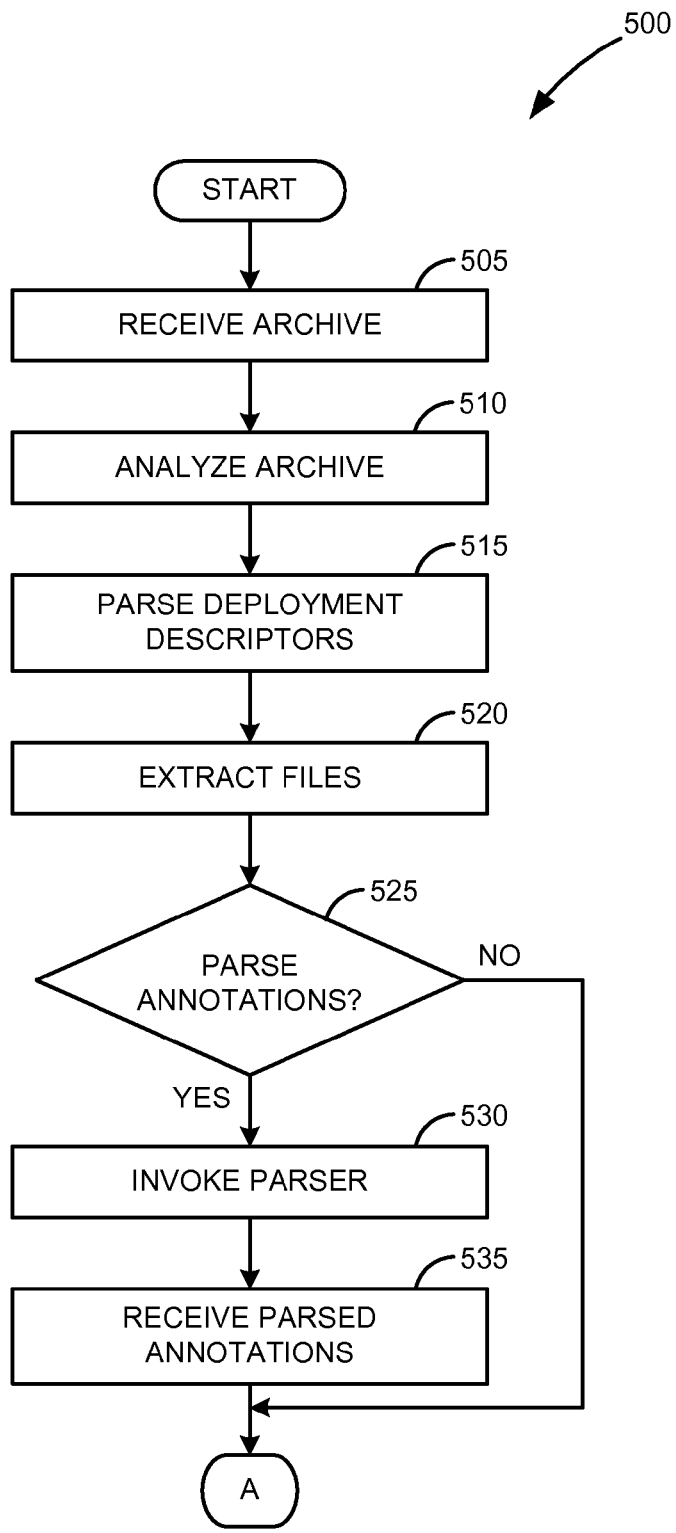
FIG. 5A illustrates a first part of a process for deploying software modules in a computer system, according to one embodiment of the invention.

FIG. 5A is a flowchart of a first part of deployment process 500 according to one embodiment of the invention. The deployment process starts with receiving an archive containing a software application at Deploy Service for deployment at block 505. In Java EE Specification, the application is usually packed in JAR compatible archive with ".ear" file extension, e.g., deployable content is usually provided as an EAR file. It is possible to receive an archive of a standalone module for deployment, e.g., JAR file, WAR file, etc. The standalone software modules and the software modules packed in an EAR file may be of any type provided by Java EE Specification, including Web modules, EJBs, Java modules and Connector modules. Furthermore, it is possible to receive standalone software modules and EAR files including software modules that are of types that are vendor specific and are not described by the specification.

At block 510, the received archive file is analyzed. The aim of this analysis is to obtain necessary information for the deployment of the application or of the standalone module. Deploy Service performs the analysis and, based on the collected data, decides how to handle the deployment of the archive, e.g., whether annotations should be sought, what data to supply software modules validation, how to distribute software modules to containers, etc. Deployment process 500 continues at block 515 with parsing deployment descriptors that are included in the received archive file. For example, Deploy Service parses files "META-INF/application.xml" and "META-INF/application-j2ee-engine.xml". These files are application deployment descriptors for deploying software modules in Web AS, where the first file is defined by Java EE Specification, and the second file is Web AS specific (e.g., vendor specific).

Deployment descriptors provide configuration information, which is often referred to as metadata. The metadata is parsed to objects for further processing during the deployment. The metadata may describe one or more software modules that are included in the received archive file. Additionally, each container of the application server that is registered with the Deploy Service may subscribe for files with a specific file name or extension, or subscribe for software modules of a specific type.

When a deployment descriptor is not present, and when no container has subscribed for particular software modules, the deployable software modules may be determined according to the following algorithm:

All files included in the received archive with ".war" extension are considered Web modules. The context root of the Web module is the name of the file relative to the root of the application package, but with the ".war" extension removed.

All files included in the received archive with ".rar" extension are considered Connectors.

For all files included in the received archive with ".jar" extension, but not contained in the "lib" directory of the archive, do the following:

If the JAR file contains "META-INF/MANIFEST.MF" file with a "Main-Class" attribute, or contains "META-INF/application-client.xml" file, consider the JAR file to be a Java module.

If the JAR file contains a "META-INF/EJB-jar.xml" file, or contains any class with an EJB component annotation (e.g., "Stateless", etc.), consider the JAR file to be an EJB module.

All other JAR files are ignored unless referenced by a JAR file discovered above using one of the JAR file reference mechanisms such as the Class-Path header in a manifest file.

According to Java EE Specification, "MANIFEST.MF" is a special file that can contain information about the files packaged in a JAR file. By checking the metadata stored in this file, the purpose of the instant JAR file could be identified. The file "application-client.xml" is a deployment descriptor file for a Java EE client-side software module. The file "EJB-jar.xml" is a deployment descriptor that provides persistence metadata necessary for container managed persistence of EJBs. The path to the metadata files in the JAR or EAR archives compatible with Java EE Specification is "META-INF/". In other words, the different deployment descriptor files and the manifest file for an application or for a standalone software module could be found in "META-INF" directory of the corresponding EAR file or JAR file, respectively.

Determining modules is preferably a functionality of the deploy framework, and more specifically of the Deploy Service. In the described exemplar embodiment, Deploy Service holds information for modules in instance of "com.sap.engine.services.deploy.ear.Module" class. Going in detail, there are two generic types of software modules: class "J2EEModule" for the standard software modules types described in Java EE Specification (Web, EJB, Java and Connector) and defined in "com.sap.engine.services.deploy.ear.J2EEModule.Type" enum (enumerated type); and class "Module" for the other modules.

For a software module from any of the standard types, the class "J2EEModule" is abstract because one of its successors "Java", "EJB", "Connector" or "Web" classes is instantiated. The software modules represented with instances of "J2EEModule" class have constructors with parameters "parentTmpDir" and "aUri". The first parameter provides a temporary directory where all module files of the deployable archive should be extracted. The second parameter provides a directory path from the temporary folder "parentTmpDir" to the instant module file. The modules represented with instances of "J2EEModule" class originating from Web standard module type have constructors with additional parameter "aContextRoot" providing reference to the context root.

The modules that are not from one of the four standard types are represented with instances of "com.sap.engine.services.deploy.ear.Module" class. The class "Module" has constructor with parameters "parentTmpDir", "aUri" and "aModuleType". The parameter "aModuleType" provides the name of a container that will deploy the software module represented by a specific instance of the "Module" class. The container has to be registered with the Deploy Service. Table 1 shows example code snippets for defining classes representing deployable software modules:

TABLE 1

| Module Type | Example Code Snippet |
|---|---|
| EJB | public EJB(File parenturiDir, String aUri) { ... } |
| Web | public Web(File parentTmpDir, String aUri, String aContextRoot) { ... } |
| Non-standard type | public Module(File aParentTmpDir, String aUri, String aModuleType) { ... } |

A container subscribes for software modules with particular file names or particular extensions by providing appropriate information (e.g., code) in the configuration information of the container in class "containerInfo". Table 2 shows example code snippets for "containerInfo" class, providing subscription for software modules with particular file names and extensions:

TABLE 2

| Files if present in the archive | Example code snippets |
|---|---|
| "configuration/config.xml"; "META-INF/MANIFEST.MF"; "anymodule.mod"; "a/b/c/d.e" "*.mp3"; "*.sda"; "*.jar"; "*.war" | ContainerInfo containerInfo = .... containerInfo.setFileNames(new String[ ]{"configuration/config.xml", "META-INF/MANIFEST.MF", "a/b/c/d.e", "anymodule.mod"}); containerInfo.setFileExtensions(new String[ ] {".mp3", ".sda", ".jar", ".war"}); |

Another mechanism for determining software modules in a deployable archive is based on rules related to software types, according to an embodiment of the invention. For a particular software module, the Deploy Service tries to determine all containers where the module will be deployed. When such a software module is delivered packed in an SDA file, it might contain additional manifest file in the meta folder of the SDA file "META-INF". In the particular embodiment of the invention within Web AS environment, the additional manifest file is "SAP_MANIFEST.MF". The file "SAP_MANIFEST.MF" contains many properties, including "softwaretype" and "softwaresubtype".

Containers subscribe for software modules with particular "softwaretype" or "softwaresubtype" or both in a way that is similar to the subscriptions for particular file names or extensions. Software modules that have a particular value corresponding to "softwaretype" or "softwaresubtype" or both in "SAP_MANIFEST.MF" will be deployed in a container with corresponding configuration information in its "containerInfo" class. Table 3 shows an example for a subscription for software modules having particular "softwaretype":

TABLE 3

| Software modules with attributes: | Example code snippets |
|---|---|
| "softwaretype" set to "FS": "sotwaretype: FS" | ContainerInfo containerInfo = ... containerInfo.setSoftwareTypes(new String[ ] {"FS"}); |
| "softwaretype" and "softwaresubtype" that cause method "isSoftwareTypeSupported" to return true | ContainerInfo containerInfo = ... { public boolean isSoftwareTypeSupported(String softType, String softSubType) { return "MyPreferedSoftwaresubtype".equals(softSubType); } }; |

Referring back to FIG. 5A, at block 520, deployment process 500 continues with extracting all software module entries that are determined either based on the metadata stored in the deployment descriptors and the manifest files, or based on the established naming rules based on the subscriptions of the containers for software modules with certain file names and software types. The determined software modules entries or files are extracted in a temporary folder in the computer system where the archive is deployed.

In version 5 of the Java EE Specification a mechanism for adding annotations to the software modules class files is introduced. With the help of the annotations, the developers of Java EE applications can provide the same metadata provided by the deployment descriptors. For the software modules where annotations are allowed, deployment descriptors are optional. When both annotations and deployment descriptors are provided for a software module, the metadata in the deployment descriptors have priority over the annotations.

At block 525, a decision is taken whether to parse the deployable archive files for annotations. The decision depends on the version of the deployable application or standalone module packed in the received archive. The version of the application, or the standalone module respectively, could be identified from a corresponding deployment descriptor. For applications with Java EE version of the application deployment descriptor (e.g., "application.xml") less than version 5, no annotations processing is performed. If application deployment descriptor does not exist or exists with Java EE version 5 or higher, then version checks are performed for each JAR format file with extensions ".war" or ".jar". Only files with no module deployment descriptor or with module deployment descriptor with Java EE version 5 or higher are sought for annotations. If a module contains a deployment descriptor with Java EE version less than version 5, no annotations are sought in it.

Standalone modules with file extension ".war" or ".jar" may contain annotations. If such a module does not contain a module deployment descriptor or contains one with Java EE version 5 or higher, this module should be processed for annotations. Still, if a module contains two module deployment descriptors and one of them is an old one, no annotations are sought in it.

When the decision is to parse for annotations, the class files in the received archive or the class file for a particular software module, deployment server calls an AS Java library at block 530, according to one embodiment of the invention. This library is named "Byte Code Analysis" (BCAnalysis) and is integrated with the deploy framework. Searching for annotations is an expensive operation that could consume a high amount of time and machine resources. There are several ways to optimize the parsing of annotations during deploy process. For example, BCAnalysis is called once at most for a deployable archives Deploy Service could pass all found annotations to the containers, saving the additional calls which would be performed by each interested container invoking the library on its own. Furthermore, the Container Interface could provide detailed checks which application and standalone modules need for annotations processing. BCAnalysis could search only for a limited set of annotation types, thus saving extra resources for finding annotation types unnecessary for the deployment process.

BCAnalysis library is the component where annotation processing is centralized for all containers and modules. It builds up a tree containing the result for the whole application. Deploy Service creates a class loader for all standard, predefined annotations. Then it creates an instance of "ReaderFactory" object and initializes it with the created class loader. The instance of "ReaderFactory" object could be supplied with a filter for annotation types to be processed. On deployment, Deploy Service instantiates "ClassInfoReader" object from the factory and provides it one or more software modules files. As an output an instance of "ReadResult" object is produced, which keeps the whole processed information into a tree structure. The "ReadResult" instance is returned to Deploy Service at block 535. Objects "ReaderFactory", "ClassInfoReader" and "ReadResult" are classes of AS Java engine.

When the decision at block 525 is not to parse annotations, the BCAnalysis is not invoked and respectively, deploy server does not receive any additional metadata.

Figure 5B:
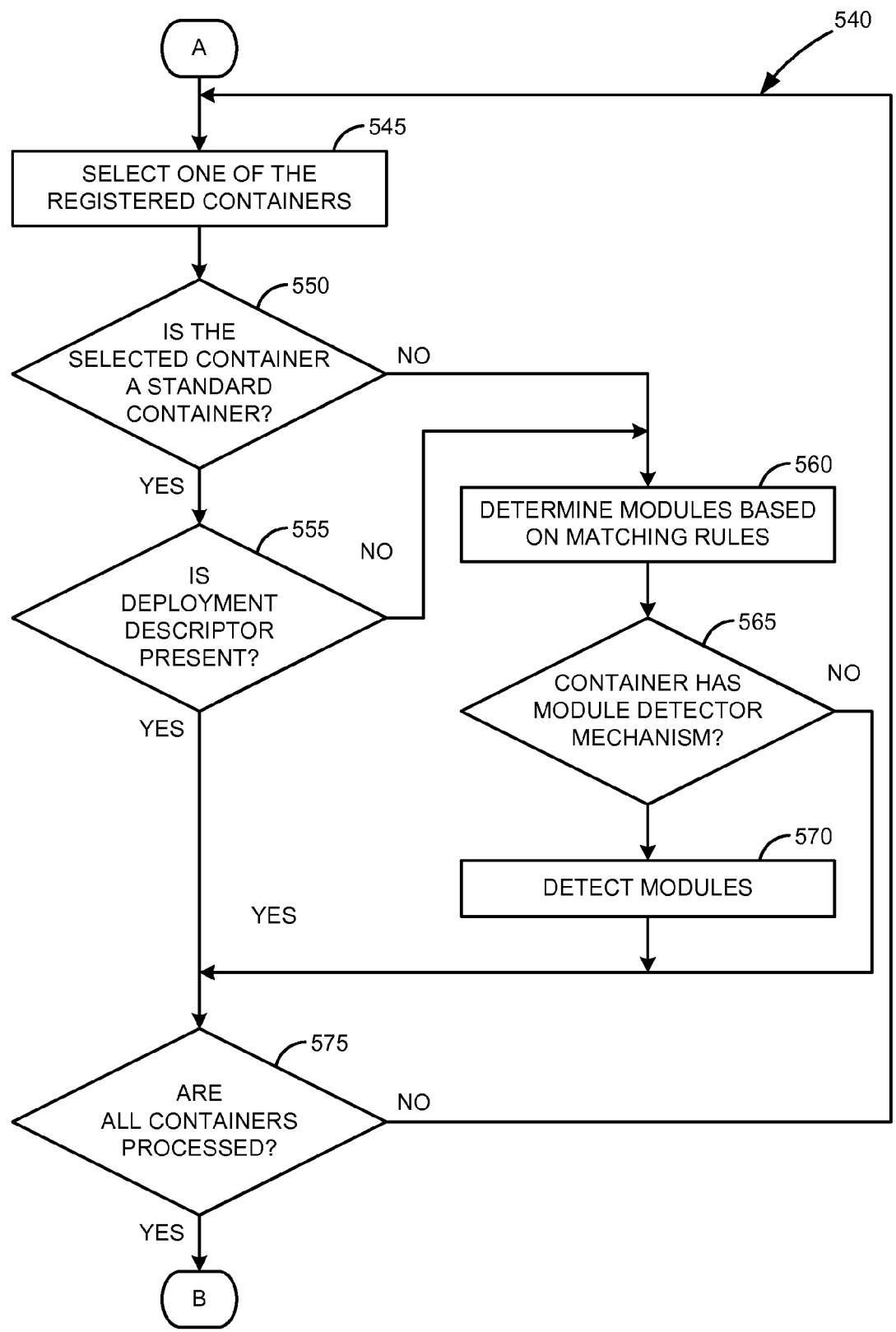
FIG. 5B illustrates a second part of the process for deploying software modules in a computer system, according to one embodiment of the invention.

FIG. 5B is a flowchart of a second part of the deployment process 540 illustrated in FIG. 5A. Deploy Service may not contain any container specific logic, according to one embodiment of the invention. The distribution of the deployable software modules from the received archive to the corresponding containers is performed via mechanisms defined by both Java EE Specification and by Container Interface contract. Each container registered with Deploy Service can subscribe for files with specific names, extensions or software types. In addition, each registered container can make use of a mechanism for detecting software modules via providing its own implementation for searching the files it is interested in. With such a mechanism a container may perform dynamic checks over a file from the deployable archive in order Deploy Service to decide if this file should be distributed to the container for deployment.

At block 545, the deployment process continues with selecting a container from the containers that are registered with Deploy Service. For the selected container, a check is performed at block 550 whether it is a container defined by Java EE Specification, or a vendor specific container, e.g., whether it is a standard or non-standard container. Standard containers deploy standard Java EE software modules, including "EJB", "Web", "Java" and "Connector" modules. All other containers are referred as non standard or non Java EE containers, no matter to what extent they follow the definitions of Java EE Specification.

If the selected container is a Java EE container, the received archive is checked for existing deployment descriptor (DD) at block 555. In one embodiment of the invention, the folder "META-INF" of the received archive is searched for file "application.xml". According to Java EE Specification, standard deployment descriptor "application.xml", if present, specifies all software modules in the application to be deployed. Respectively, there is no need to detect the software modules to be deployed in a Java EE container if they are specified in an available deployment descriptor.

If the selected container is not a Java EE container, or if there is no deployment descriptor in the received archive, deployment process continues at block 560. For each container there are software modules matching rules defined either by Java EE specification or by a subscription. The matching rules could define correspondence between the selected container and software modules having class files with specific names or extensions, or having predefined software types. Based on the matching rules, at block 560, a set of software modules from the received archive is determined.

At block 565, a check is performed on whether the selected container has a module detecting mechanism. In this document, module detecting mechanism is also called "module detector". If the selected container has implemented a module detector, at block 570, Deploy Service invokes module detector to perform its detecting logic for each determined software module. The operations of blocks 545 through 570 are executed repeatedly for all registered containers, until, at block 575, it is confirmed that all registered containers are processed.

Other containers may require more elaborate dynamic checks over archive contents and would examine the archive based on predefined logic implemented in such containers as a mechanism for detecting software modules. For example, a non Java EE container may deploy music files. Existing matching rules may define correspondence between the container and files with extension ".jar". However, the container is not interested in every file with extension ".jar" in the received archive, but only in those that contain an "mp3" directory. This additional check could be performed by the logic of a module detector implemented in the container.

In another example, to two different Java EE containers correspond to software modules both with extension ".jar", according to the specified matching rules. The first Java EE container deploys "EJB" Java EE modules. The second Java EE container deploys "java" Java EE modules. Therefore, a second dynamic check over the contents of the received archive is necessary in order to detect when a software module with a file entry with extension ".jar" have to be deployed on the first or on the second container. A module detector implemented in either of the two containers may check for a presence of a specific deployment descriptor for the module, e.g., check for "META-INF/EJB-jar.xml" for "EJB" module, and "META-INF/application-client.xml" for the "java" module, respectively. Furthermore, in case a deployment descriptor for a ".jar" module does not exist, the module detector mechanism of one of the containers may check for specific annotations, if present, to decide about the correspondence between the software module and the container.

According to the example embodiment of the invention in AS Java, detailed implementation of a module detector can be found in a container interface class, as shown in table 4:

TABLE 4

```
Class "com.sap.engine.services.deploy.container.rtgen.ModuleDetector"
public interface ModuleDetector extends java.io.Serializable {
/**
 * @param tempDir root dir of extracted EAR file. The detector
 should read its module file from <code>relativeModuleUri</code>
 from this dir.
 * @param moduleRelativeFileUri The relative module file URI.
 Detector should read and analyze that file in order to determine
 if this file is a module.
 * @return The detected module or null.
 * @throws GenerationException
 */
 public abstract Module detectModule(File tempDir, String
 moduleRelativeFileUri) throws GenerationException;
```

Table 5 illustrates a simple implementation of a module detector for a Java EE container that deploy "Web" Java EE modules:

TABLE 5

```
public class WebModuleDetector implements ModuleDetector {
    public   Module   detectModule(File   aTempDir,
    String   aModuleRelativeFileUri)
```

TABLE 5-continued

```
    throws GenerationException {
        if (!aModuleRelativeFileUri.endsWith(".war")) return null;
        StringBuffer contextRoot = new
        StringBuffer(aModuleRelativeFileUri);
        contextRoot.delete(contextRoot.length( ) – ".war".length( ),
        contextRoot.length( ));
        return new Web(aTempDir, aModuleRelativeFileUri,
        contextRoot.toString( ));
    }
}
```

The "Web" Java EE modules reside in JAR compatible archives in file entries with ".war" extension. Hence, the Java EE container that is interested in such software modules should set corresponding matching rule by subscribing for software modules with ".war" file extension. In its module detector implementation, container may incorporate logic for defining a default context root for a "Web" module. Integrating the module detector of the container could be done by setting it to the "ContainerInfo", as shown in table 6:

TABLE 6

```
ContainerInfo WebInfo = ...
WebInfo.setFileExtensions(new String[ ] {".war"});
WebInfo.setModuleDetector(new WebModuleDetector( ));
```

An example of a module detector that utilizes annotations is illustrated with snippets of pseudo code in table 7. The module detector provides an implementation of a "AnnotationsSupportingModuleDetector" class:

TABLE 7

```
Class
"com.sap.engine.services.deploy.container.rtgen.AnnotationsSupportingModuleDetector"
public   abstract   class   AnnotationsSupportingModuleDetector   implements
ModuleDetector{
    public final Module detectModule(File tempDir, String moduleRelativeFileUri)
throws GenerationException {
        return      detectModule(tempDir,       moduleRelativeFileUri,
((DirAnnotation)tempDir).getAnnotations( ));
    }
/**
    * @param tempDir root dir of extracted EAR file. The detector should read its
module file from <code>relativeModuleUri</code> from this dir.
    * @param moduleRelativeFileUri The relative module file URI. Detector should
read and analyze that file in order to determine if this file is a module.
    * @param parsedAnnotations The result from the parsed annotations. If there is no
need for parsing annotations (J2EE 1.4 and less applications)
    *   the   <code>parsedAnnotations</code>   will   not   be   null   but   empty
<code>com.sap.lib.javalang.tool.ReadResult</code> object.
    * @return The detected module or null.
    * @throws GenerationException
    */
    public   abstract   Module   detectModule(File   tempDir,   String
moduleRelativeFileUri,   ReadResult   parsedAnnotations)   throws
GenerationException;
}
```

A module detector as the one illustrated with Table 7 could be used when simple checks over the content of the received deployable archive are not sufficient to determine a correspondence between a container and a software module. For example, when deploying "EJB" modules, a module detector of a Java EE container would check if "META-INF/EJB-jar.xml" module deployment descriptor is present in a JAR file of a module. If the deployment descriptor is present, then the module is regarded as "EJB". However, if such deployment descriptor does not exist, the software module with file with extension "jar" could be either "EJB" or "Java" module, or just a class library which is not an application software module. To determine if there is a correspondence between the software module and the Java EE container, the module detect mechanism may check the parsed annotations for specific entries, as illustrated in table 8:

TABLE 8

```
public class EJBModuleDetector extends AnnotationsSupportingModuleDetector {
    private static final String[ ] EJBJARXML = new String[ ] { "META-INF/EJB-
jar.xml", "meta-inf/EJB-jar.xml" };
    /**
     * Checks whether the given archive contains any Enterprise Java Beans. If so -
     * generates the corresponding J2EEModule descriptor.
     *
     * @param tempDir
     *       the temporary folder where the .ear file is extracted
     * @param moduleRelativeFileUri
     *       the name of the module file
     */
    public Module detectModule(File tempDir, String moduleRelativeFileUri,
ReadResult annotationsMetadata)
            throws GenerationException {
        try {
            // check for EJB-jar.xml
            JarFile jar = new JarFile(tempDir + File.separator + moduleRelativeFileUri);
            for (String EJBjar : EJBJARXML) {
                ZipEntry entry = jar.getEntry(EJBjar);
                if (entry != null) {
                    return new EJB(tempDir, moduleRelativeFileUri);
                }
            }
            FileInfo moduleFile = getModuleAnnotations(annotationsMetadata, tempDir,
moduleRelativeFileUri);
            if (moduleFile == null)
                return null;
            if
(moduleFile.getClassLevelAnnotations(AnnotationFilters.STATEFUL).values( ).size( ) > 0
                ||
moduleFile.getClassLevelAnnotations(AnnotationFilters.STATELESS).values( ).size( ) > 0
                ||
moduleFile.getClassLevelAnnotations(AnnotationFilters.MESSAGE__DRIVEN).values ( ).size( ) >
0) {
                // workaround for CTS 5 because the application client JAR also contains
                // classes with the same annotations
                String mainClass = null;
                try {
                    mainClass = jar.getManifest( ).getMainAttributes( ).getValue("Main-Class");
                } catch (NullPointerException exc) {//$JL-EXC$
                    // nothing to do, probably no manifest
                }
                if (mainClass == null) { // no app client
                    return new EJB(tempDir, moduleRelativeFileUri);
                }
            }
            return null;
        } catch (IOException ioexc) {
            throw new GenerationException("Cannot get " + moduleRelativeFileUri + "
module.", ioexc);
        }
    }
    /**
     * @deprecated use filters for module files within EAR file when they are
     *            implemented
     * @param tempDir
     * @param moduleRelativeFileUri
     * @param files
     * @return
     */
    private FileInfo getModuleAnnotations(ReadResult annotationsMetadata, File
tempDir, String moduleRelativeFileUri) {
        FileInfo[ ] files = ((FolderInfo)
annotationsMetadata.getProcessedFiles( )[0]).getFiles( );
        FileInfo moduleFile = null;
        String moduleFullPath = new File(tempDir,
moduleRelativeFileUri).getAbsolutePath( );
        for (FileInfo fileInfo : files) {
```

TABLE 8-continued

```
    if (moduleFullPath.equals(fileInfo.getFullPath( ))) {
      moduleFile = fileInfo;
      break;
    }
  }
}
  return moduleFile;
}
```

For the Java EE container implementing the module detector shown in Table 8, the class "ContainerInfo" may contain definitions illustrated with the code snippets in the following Table 9:

TABLE 9

```
    ContainerInfo EJBInfo = ...
    EJBInfo.setFileExtensions(new String[ ] {".jar"});
    EJBInfo.setModuleDetector(new EJBModuleDetector( ));
```

In addition to module detectors, some of the registered containers may implement mechanisms for generating new modules during the deployment process, according to one embodiment of the invention. In this document, a mechanism for generating new software modules is called "module generator". In addition to generating modules, a module generator implemented in a container may remove some of the modules delivered with the received archive.

For example, according to Java EE Specification, Web services container deploy software modules containing Web services. Web services could be provided with "EJB" software modules and with "Web" software modules. Therefore, the module detector of the Web services container would detect correspondence between the container and modules with files with extensions ".war" and "jar" containing Web services. A servlet should be available for the Web services included in the detected WAR and JAR files to be accessible. Each WAR file containing "Web" software module provides such a servlet originally. However, JAR files that contain "EJB" modules do not contain servlets. Therefore, for each "EJB" software module, a new WAR file is generated containing "Web" module with the necessary servlet in it to provide access to the Web service in the "EJB" module.

Figure 5C:
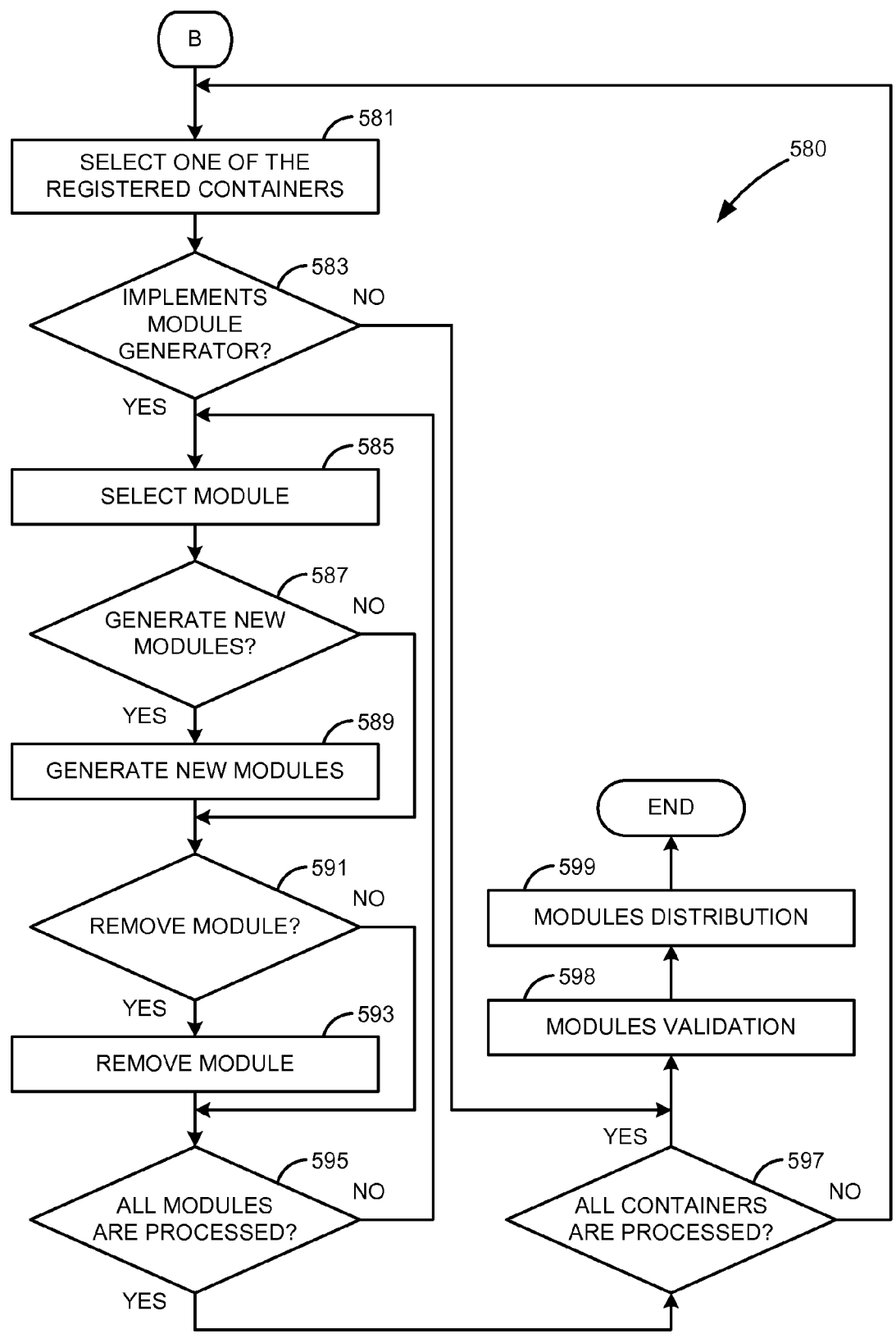
FIG. 5C illustrates a third part of the process for deploying software modules in a computer system, according to one embodiment of the invention.

FIG. 5C is a flowchart of a third part of the deployment process 580. In the previous two parts of the deployment process 500 and 540 illustrated in FIG. 5A and FIG. 5B respectively, the software modules in the received archive are determined and extracted to a temporary directory structure. Additionally, for each container registered with Deploy Service, corresponding software modules are detected. In FIG. 5C, the deployment process continues with selecting one of the registered containers at block 581. At block 583, a check is performed on whether the selected container implements module generator mechanism. In case the container provides such mechanism, one of the modules detected for the container is selected at block 585.

For the selected module, Deploy Service utilizes the module generator to check if generation of a new software module is necessary. This check is illustrated with block 587 of FIG. 5C. If the deployment of the selected software module requires one or more new software modules, the new software modules are generated at block 589. At block 591, Deploy Service utilizes module generator to check whether the selected module still have to be deployed or needs to be removed from the deployment process. If the selected module should not be deployed, it is removed at block 593. According to one embodiment of the invention, the class file specifying the module is removed from the temporary folder where it was previously extracted. The module is not removed from the original archive file.

For example, a vendor specific Web services container has deployed a different, e.g., old versioned, type of files before a certain change in the software versions of Java EE Specification. The old versioned files may be provided with files with extensions ".wsar". With the adoption of a newer version of Java EE Specification, the vendor specific container have to deploy Web services delivered in files with different format, e.g., WAR files and JAR files. However, it would be desirable if the container continues to be able to deploy Web services delivered with old versioned files. For this reason, according to one embodiment of the invention, container has to detect the software modules in such old versioned files, generate new software modules in new format files from them, and remove the original files. This process is similar to a migration that is implemented in the very beginning of the deployment. Thus, the rest of the deployment logic is cleared from additional checks and different treatments for the different file versions.

Table 10 provides technical details of how modules generator mechanism is implemented in a container in AS Java, according to one embodiment of the invention. In the provided example, the main interface of the module generator is in container interface:

TABLE 10

```
Class "com.sap.engine.services.deploy.container.rtgen.Generator"
public interface Generator extends Serializable {
  /**
   *
   * @param tempDir root dir of extracted ear file. The generator should read its
  module file under <code>relativeModuleUri</code> from this dir.
   * <p>The result module files should be written to this folder.
   * @param moduleRelativeFileUri The relative module file URI triggered this
  generation. Generator should read and analyze that file in order to determine what to
  generate.
   * @param parsedAnnotations The result from parsed annotations. If there is no need
  for parsing annotations (J2EE 1.4 and less applications)
   * the <code>parsedAnnotations</code> will be not null but empty
  <code>com.sap.lib.javalang.tool.ReadResult</code> object.
```

TABLE 10-continued

```
 * @return Description of the generation result. Array of
<code>com.sap.engine.services.deploy.ear.Module</code> objects each of them
containing the container that should process the generated module
     * and relative to <code>tempDir</code> URI where module file was generated.
     * @throws GenerationException
     */
    Module[ ] generate(File tempDir, String moduleRelativeFileUri) throws
GenerationException;
    /**
     * Called in order to determine is generation needed for the given file corresponding
to Generators container.
     * @param moduleRelativeFileUri one of the files corresponding to the Generators
container.
     * @return is generation required for this file.
     * @throws GenerationException
     */
    boolean supportsFile(String moduleRelativeFileUri);
    /**
     * Determines whether file triggered generation should be removed from result EAR
file
     * @param moduleRelativeFileUri one of the files corresponding to the
<code>Generator</code>s container.
     * @return Whether module corresponding to this file should be removed from result
EAR file
     * @throws GenerationException
     */
    boolean removeModule(String moduleRelativeFileUri);
}
    public boolean supportsFile(String filePath) {
      return filePath.endsWith(".bot") || filePath.endsWith(".bot1") ||
filePath.endsWith(".bot2");
    }
```

In example code snippets provided in Table 10, the generator mechanism of a container utilizes a function to check whether a file is supported by the container. It can be a file name or an extension check in the simplest case. However, more specific checks could be added, if the container requires it. The example implementation in Table 10 above shows a case of a container that supports all files with extensions: ".bot", ".bot1", ".bot2".

The logic of the implemented generate mechanism in a container determines whether to perform wither "generate" or "remove" scenarios, or both. Table 11 below illustrates an example where "generate" scenario is supported for files with extensions ".bot" and ".bot1". If such files exist in the deployable archive, Deploy Service utilized the module generator mechanism of the container to physically create new files and to return modules for them. These new modules are then added to the list of modules designated for the container:

TABLE 11

```
  public Module[ ] generate(File tempDir, String moduleRelativeFileUri)
throws GenerationException {
    Module[ ] result = new Module[0];
    try {
      if (moduleRelativeFileUri.endsWith(".bot")) {
        result = new Module[2];
FileUtils.copyFile(test.getFile("resources/Deploy/PreprocessGeneration-
Test/EJB.jar"), new File(tempDir,
```

TABLE 11-continued

```
            pathToGeneratedEJB));
        result[0] = new Module(tempDir, pathToGeneratedEJB,
mContainer.getName( ));
FileUtils.copyFile(test.getFile("resources/Deploy/PreprocessGeneration-
Test/Web.war" ), new File(tempDir,
            pathToGeneratedWeb));
        result[1] = new Module(tempDir, pathToGeneratedWeb,
mContainer.getName( ));
      } else if (moduleRelativeFileUri.endsWith(".bot1")) {
        result = new Module[1];
FileUtils.copyFile(test.getFile("resources/Deploy/PreprocessGeneration-
Test/EJB.jar"), new File(tempDir,
            pathToGeneratedEJB1));
        result[0] = new Module(tempDir, pathToGeneratedEJB1,
mContainer.getName( ));
      }
    } catch (IOException e) {
      throw new GenerationException(e.getLocalizedMessage( ), e);
    }
    return result;
  }
```

In one embodiment of the invention, when a container expects annotations to be present in its corresponding modules, the implemented module generator mechanism may use an abstract class to provide annotations sensitive generate method, as illustrated with the sample code snippets in Table 12 below. Via this method, during 'generate' phase parsed annotations are available to the container and it may decide what modules to generate on this basis:

TABLE 12

```
Class
"com.sap.engine.services.deploy.container.rtgen.AnnotationsSupportingGenerator"
/**
 *
 * @param tempDir root dir of extracted ear file. The generator should read its
module file under <code>relativeModuleUri</code> from this dir.
```

TABLE 12-continued

```
 * <p>The result module files should be written to this folder.
 * @param moduleRelativeFileUri The relative module file URI triggered this
generation. Generator should read and analyze that file in order to determine what to
generate.
 * @param parsedAnnotations The result from parsed annotations. If there is no need
for parsing annotations (J2EE 1.4 and less applications)
   * the <code>parsedAnnotations</code> will be not null but empty
<code>com.sap.lib.javalang.tool.ReadResult</code> object.
 * @return Description of the generation result. Array of
<code>com.sap.engine.services.deploy.ear.Module</code> objects each of them
containing the container that should process the generated module
   * and relative to <code>tempDir</code> URI where module file was generated.
   * @throws GenerationException
   */
  public abstract Module[ ] generate(File tempDir, String moduleRelativeFileUri,
  ReadResult parsedAnnotations) throws GenerationException;
```

The implementation of a "remove" scenario in an exemplar module generator is illustrated below with the code snippets in Table 13. The "remove" mechanism of module generator does not remove the files of the selected modules physically from the archive, but just ignores them for the particular container. The example logic would remove ".wsar" file of a software module containing Web services:

TABLE 13

```
Class "com.sap.engine.services.deploy.container.rtgen.Generator"
/**
 * Determines whether file triggered generation should be removed
from result EAR file
 * @param moduleRelativeFileUri one of the files corresponding to the
<code>Generator</code>s container.
 * @return Whether module corresponding to this file should be
removed from result EAR file
 * @throws GenerationException
 */
public boolean removeModule(String filePath) {
  return filePath.endsWith(".wsar");
}
```

Having providing detailed examples for the different cases of module generate mechanism implementation, Table 14 illustrates an assembled example of a module generator:

TABLE 14

```
private final class FullGenerator implements Generator {
  private ContainerInfo mContainer;
  public FullGenerator(ContainerInfo aContainer) {
    mContainer = aContainer;
  }
  public Module[ ] generate(File tempDir, String
moduleRelativeFileUri) throws GenerationException {
    Module[ ] result = new Module[0];
    try {
      if (moduleRelativeFileUri.endsWith(".bot")) {
        result = new Module[2];
FileUtils.copyFile(test.getFile("resources/Deploy/PreprocessGeneration-
Test/EJB.jar"), new File(tempDir,
          pathToGeneratedEJB));
        result[0] = new Module(tempDir, pathToGeneratedEJB,
mContainer.getName( ));
FileUtils.copyFile(test.getFile("resources/Deploy/PreprocessGeneration-
Test/Web.war"), new File(tempDir,
          pathToGeneratedWeb));
        result[1] = new Module(tempDir, pathToGeneratedWeb,
mContainer.getName( ));
      } else if (moduleRelativeFileUri.endsWith(".bot1")) {
        result = new Module[1];
FileUtils.copyFile(test.getFile("resources/Deploy/PreprocessGeneration-
Test/EJB.jar"), new File(tempDir,
          pathToGeneratedEJB1));
        result[0] = new Module(tempDir, pathToGeneratedEJB1,
```

TABLE 14-continued

```
mContainer.getName( ));
      }
    } catch (IOException e) {
      throw new GenerationException(e.getLocalizedMessage( ), e);
    }
    return result;
  }
  public boolean supportsFile(String filePath) {
    return filePath.endsWith(".bot") || filePath.endsWith(".bot1") ||
filePath.endsWith(".bot2");
  }
  public boolean removeModule(String filePath) {
    return filePath.endsWith(".bot1") || filePath.endsWith(".bot2");
  }
}
```

Once a container has implemented a module generator mechanism as shown in Table 14, the ContainerInfo class of the container could be set. The code snippets of Table 15 below illustrate an example of such definition of ContainerInfo. Thus the module generation mechanism of the container is available to the deploy process through Deploy Service:

TABLE 15

```
ContainerInfo mInfo = ...
mInfo.setFileExtensions(new String[ ] {".bot", ".bot1", ".bot2"});
mInfo.setGenerator(new FullGenerator(mContainer));
```

Referring back to FIG. 5C, the operations of the deployment process illustrated with blocks 585 through 593 are executed repeatedly for all detected software modules that correspond to the selected container, until, at block 595 it is confirmed that all such modules are processed. Respectively, the operations of the deployment process illustrated with blocks 581 through 595 of flowchart 580 are executed repeatedly for all registered containers, until, at block 597, it is confirmed that all such containers are processed.

The deploy process continues at block 598 with validation of the software modules of the received archives According to one embodiment of the invention, after all deployable software modules are determined and the correspondence between the software modules and the containers is detected, the software modules have to be validated by a validation framework. The validation framework could be a library developed in accordance with the requirements of Java EE Specification. In the example implementation of the invention in AS Java, the validation framework is provided by JLinEE class library. JLinEE is a framework for performing validation tests over software modules. The goal is to check their correctness and report problems if there are any. Tests are specific for the different containers, and are usually provided by container developers. JLinEE tests are executed before the deployable modules have been distributed to containers for actual deployment. This way, errors and warnings are issued earlier and without redundant data flow and transactions roll backs.

Deploy Service gathers all data required for the validation and passes it to the validation framework at block 598. The gathered data may include descriptive information about the software modules or about the application itself, parsed annotations, the software modules of the application, the version of Java EE Specification of the application, the resources rendered from the application, e.g., outside classpath, etc. Furthermore, each container registered with Deploy Service may provide tests for validation of deployment descriptors, parsed annotations, and merged model. Through the validation framework, some of the registered containers will have to perform tests over descriptors and annotations, then merge the metadata coming from both, validate it and check it for correspondence with class files from the archive.

The output form software modules validation is a report with all warnings and errors that have been encountered during the tests. A result info contains errors and warnings, if there any. In case of no errors, a validated model is returned for each deployable software module. The validated models are cached and available to Deploy Service to obtain them, according to one embodiment of the invention. If there are errors, deployment process could be aborted.

After the deployable software modules delivered with the received archive have been validated, their real deployment in the corresponding containers is processed. At block 599, Deploy Service distributes the software modules files together with the validated models and the metadata for the software modules to the corresponding containers.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter. In this document, the meaning of the term "computer readable media" is limited to an article of manufacture for tangibly storing computer-readable instructions.

Figure 6:
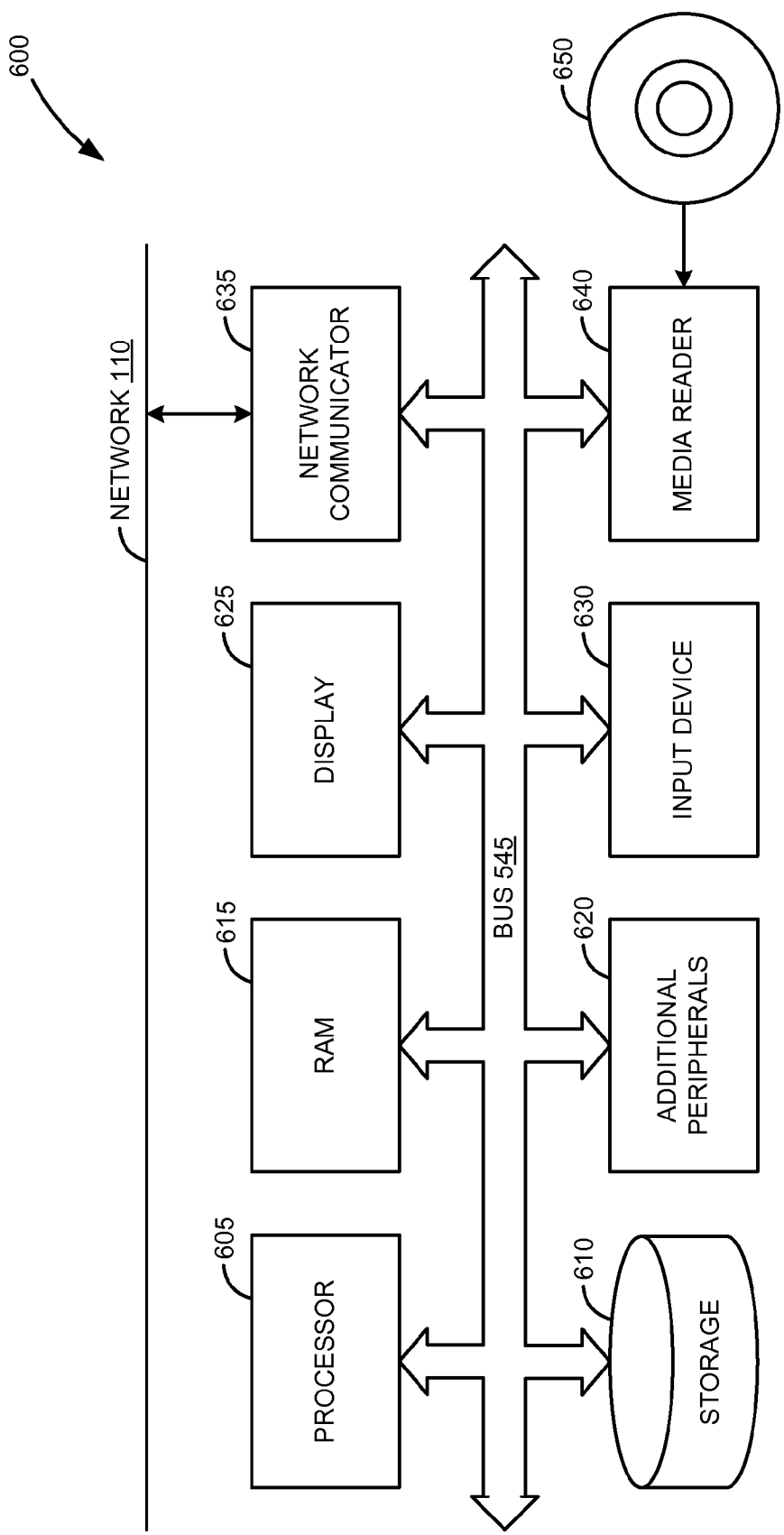
FIG. 6 is a block diagram of an exemplary computer system to execute computer readable instructions to deploy software modules, according to one embodiment of the invention.

FIG. 6 is a block diagram of an exemplary computer system 600. Computer system 600 includes a processor 605 that executes programming code tangibly stored on computer readable medium 650 to perform the methods of the invention. Computer system 600 includes media reader 640 to read the programming code from computer readable medium 650 and store the code in storage 610 or in random access memory (RAM) 615. Storage 610 provides a large space for keeping static data. The programming code could be stored in storage 610 for later execution. From the programming code, a series of instructions are generated and dynamically stored in RAM 615. Processor 605 reads instructions from RAM 615 and performs actions as instructed.

According to one embodiment of the invention, computer system 600 further includes display 625 to provide visual information to users, input device 630 to provide a user with means for entering data and interfere with computer system 600, one or more additional peripherals 620 to further expand the capabilities of computer system 600, and network communicator 635 to connect computer system 600 to network 110. The modules of computer system 600 are interconnected via a bus 645.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Reference throughout this specification to "one embodiment" or "an embodiment" means that a particular feature, structure or characteristic described in connection with the embodiment is included in at least embodiment of the invention. Thus, the appearance of the phrases "in one embodiment" or "in an embodiment" in various places throughout this specification are not necessarily all referring to the same embodiment. Furthermore, the particular features, structures or characteristics may be combined in any suitable manner in one or more embodiments.

What is claimed is:

1. An article of manufacture comprising a non-transitory computer-readable medium having computer readable instructions stored thereon for execution by a processor to:
register a plurality of containers, wherein at least one of the plurality of containers provide a runtime environment for a corresponding type of software module in the computer system;
extract a plurality of files from an archive on a storage, wherein the plurality of files comprise one or more software modules to be deployed in the plurality of containers;
extract configuration metadata from at least one annotation and at least one deployment descriptor provided by at least one of the plurality of files extracted from the archive;
detect a software module of the one or more software modules corresponding to a container of the plurality of containers based on the extracted configuration metadata according to a logic of a module detector mechanism implemented by the container;
validate a container specific model according to a logic for building a model implemented by the container, wherein the container specific model comprises the extracted configuration metadata;
validate the detected software module based on the configuration metadata through the container specific model implemented by the container; and
distribute the detected software module to the corresponding container based on the validations.

2. The article of manufacture of claim 1, wherein registering the plurality of containers comprises:
receiving a subscription for a set of software modules, wherein the set of software modules is defined by a criteria selected from a group consisting of software module file name, software module file extension and software module; and
receiving a logic for one or more of detecting, generating and removing software modules corresponding to the container.

3. The article of manufacture of claim 1, wherein extracting the plurality of files from the archive comprises:
creating a temporary directory structure to store the plurality of files extracted from the archive based on a definition of the temporary directory structure in the archive.

4. The article of manufacture of claim 1, wherein detecting the software module corresponding to the container comprises:
   identifying one or more of a file name, a file extension and a software type of a file of the plurality of files extracted from the archive.

5. The article of manufacture of claim 1, wherein detecting the software module corresponding to the container comprises:
   dynamically checking a content of a file of the plurality of files extracted from the archive.

6. The article of manufacture of claim 1, wherein detecting the software module corresponding to the container comprises:
   identifying a version of the software module; and
   based on the version, parsing one of a deployment descriptor and an annotation, wherein the deployment descriptor is a file of the plurality of files extracted from the archive and the annotation is selected from the at least one annotation extracted from the archive.

7. The article of manufacture of claim 1 comprising the non-transitory computer-readable medium having computer readable instructions stored thereon for execution by a processor further to:
   generate a software module according to a logic relative to the container and to the detected software module.

8. The article of manufacture of claim 1 comprising the non-transitory computer-readable medium having computer readable instructions stored thereon for execution by a processor further to:
   remove a software module according to a logic relative to the container and to the detected software module.

9. A method for deploying software in a computer system comprising:
   registering a plurality of containers, wherein at least one of the plurality of containers provide a runtime environment for a corresponding type of software module in the computer system;
   extracting a plurality of files from an archive on a storage, wherein the plurality of files comprise one or more software modules to be deployed in the plurality of containers;
   extracting configuration metadata from at least one annotation and at least one deployment descriptor provided by at least one of the plurality of files extracted from the archive;
   detecting a software module of the one or more software modules corresponding to a container of the plurality of containers based on the extracted configuration metadata;
   validating a container specific model according to a logic for building a model implemented by the container, wherein the container specific model comprises the extracted configuration metadata;
   validating the detected software module through the container specific model implemented by the container; and
   distributing the detected software module to the corresponding container based on the validations.

10. The method of claim 9, wherein registering the plurality of containers comprises:
    receiving a subscription for a set of software modules, wherein the set of software modules is defined by a criteria selected from a group consisting of software module file name, software module file extension and software module; and
    receiving a logic for one or more of detecting, generating and removing software modules corresponding to the container.

11. The method of claim 9, wherein extracting the plurality of files from the archive comprises:
    creating a temporary directory structure to store the plurality of files extracted from the archive based on a definition of the temporary directory structure in the archive.

12. The method of claim 9, wherein detecting the software module corresponding to the container comprises:
    identifying one or more of a file name, a file extension and a software type of a file of the plurality of files extracted from the archive.

13. The article of method of claim 9, wherein detecting the software module corresponding to the container comprises:
    dynamically checking a content of a file of the plurality of files extracted from the archive.

14. The method of claim 9, wherein detecting the software module corresponding to the container comprises:
    identifying a version of the software module; and
    based on the version, parsing one of a deployment descriptor and an annotation, wherein the deployment descriptor is a file of the plurality of files extracted from the archive and the annotation is selected from the at least one annotation extracted from the archive.

15. The method of claim 9 further comprising:
    generating a software module according to a logic relative to the container and to the detected software module.

16. The method of claim 9 further comprising:
    removing a software module according to a logic relative to the container and to the detected software module.

17. A system comprising:
    a storage to store a plurality of files extracted from an archive, wherein the plurality of files comprise a plurality of software modules;
    a processor in communication with the storage; and
    a memory in communication with the processor, the memory comprising a plurality of containers operable to provide a runtime environment for the plurality of software modules, and a deployer operable to:
       register the plurality of containers;
       extract configuration metadata from at least one annotation and at least one deployment descriptor provided by at least one of the plurality of files extracted from the archive;
       for a container of the plurality of containers, detect a corresponding software module based on the extracted configuration metadata by a module detector mechanism implemented by the container;
       validate a container specific model according to a logic for building a model implemented by the container, wherein the container specific model comprises the extracted configuration metadata;
       validate the detected software module through the container specific model implemented by the container; and
       distribute the software module to the container based on the validations.

18. The system of claim 17, wherein the memory further comprises:
    a container interface to receive data comprising: a subscription for a set of software modules, wherein the set of software modules is defined by a criteria selected from a group consisting of software module file name, software module file extension and software module type; and a logic for one or more of detecting, generating and removing software modules corresponding to the container.

19. The system of the claim 17, wherein the deployer comprises:

a module detector to determine a correspondence between the software module and the container based on a content of a file of the plurality of files extracted from the archive.

20. The system of the claim 17, wherein the deployer comprises:

a module generator to one of generate and remove a software module according to a logic relative to the container and the detected software module.

* * * * *